US011303881B2

(12) United States Patent
Zhou

(10) Patent No.: US 11,303,881 B2
(45) Date of Patent: Apr. 12, 2022

(54) METHOD AND CLIENT FOR PLAYING BACK PANORAMIC VIDEO

(71) Applicant: HUAWEI TECHNOLOGIES CO., LTD., Shenzhen (CN)

(72) Inventor: Haojun Zhou, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 39 days.

(21) Appl. No.: 16/578,399

(22) Filed: Sep. 23, 2019

(65) Prior Publication Data

US 2020/0021795 A1 Jan. 16, 2020

(30) Foreign Application Priority Data

Mar. 23, 2017 (CN) ........................ 201710179751.8

(51) Int. Cl.
*H04N 13/349* (2018.01)
*H04N 13/361* (2018.01)
(Continued)

(52) U.S. Cl.
CPC ......... *H04N 13/349* (2018.05); *H04N 13/183* (2018.05); *H04N 13/361* (2018.05);
(Continued)

(58) Field of Classification Search
CPC .. H04N 13/349; H04N 13/361; H04N 13/183; H04N 21/6587; H04N 21/816;
(Continued)

(56) References Cited

U.S. PATENT DOCUMENTS 9,781,356 B1 * 10/2017 Banta .................... G06F 3/0485
10,015,527 B1 * 7/2018 Banta ............... H04N 21/21805
(Continued)

FOREIGN PATENT DOCUMENTS

CN 105843541 A 8/2016
CN 106131647 A 11/2016
(Continued)

OTHER PUBLICATIONS

T-REC-H.264-201610-S!!PDF-E Series H: Audiovisual and Multimedia Systems Infrastructure of audiovisual services—Coding of moving video-Advanced video coding for generic audiovisual services, Telecommunication Standardization Sector of ITU,dated Oct. 2016,total 804 pages.
(Continued)

*Primary Examiner* — Boubacar Abdou Tchoussou
(74) *Attorney, Agent, or Firm* — Maier & Maier, PLLC

(57) ABSTRACT

In various embodiments, a client device can obtain user field of view information and recommended field of view information of a panoramic video. The client can then determine, based on the user field of view information and the recommended field of view information, that a field of view range corresponding to a recommended field of view is not within a range of a user field of view. The client can display an image corresponding to the user field of view and an image within the recommended field of view. An image corresponding to a recommended field of view can be prompted and presented, so that the user independently determines whether to switch a field of view.

15 Claims, 11 Drawing Sheets

(51) Int. Cl.

| | |
|---|---|
| ***H04N 13/183*** | (2018.01) |
| ***H04N 21/6587*** | (2011.01) |
| ***H04N 21/81*** | (2011.01) |
| ***H04N 21/47*** | (2011.01) |
| ***H04N 21/431*** | (2011.01) |
| *H04L 67/01* | (2022.01) |

(52) U.S. Cl.

CPC ......... *H04N 21/4316* (2013.01); *H04N 21/47* (2013.01); *H04N 21/6587* (2013.01); *H04N 21/816* (2013.01); *H04L 67/42* (2013.01)

(58) Field of Classification Search

CPC ............... H04N 21/47; H04N 21/4316; H04N 21/21805; H04N 21/44; H04N 21/472

See application file for complete search history.

(56) References Cited

U.S. PATENT DOCUMENTS 10,062,414 B1 * 8/2018 Westphal ......... H04N 21/23406
10,491,817 B2 * 11/2019 You ......................... G06F 3/013
10,540,005 B2 * 1/2020 Yoon ...................... G02B 27/01
10,600,153 B2 * 3/2020 Roimela ............ H04N 5/23238
10,863,159 B2 * 12/2020 Oh .......................... G06F 3/011
10,887,653 B2 * 1/2021 Hsieh ............... H04N 21/21805
2013/0141523 A1 6/2013 Banta et al.
2013/0141526 A1 6/2013 Banta et al.
2016/0050349 A1 * 2/2016 Vance ................... G06T 3/0043 348/36
2016/0260196 A1 * 9/2016 Roimela ........ H04N 21/234363
2016/0381398 A1 * 12/2016 Saxena ................ H04N 21/816 348/39
2017/0026577 A1 * 1/2017 You ........................ G11B 27/28
2017/0076497 A1 3/2017 Inomata
2018/0091852 A1 * 3/2018 Hsieh ............... H04N 21/47217
2018/0275749 A1 * 9/2018 Yoon ...................... G02B 27/01
2019/0174150 A1 * 6/2019 D'Acunto ........ H04N 21/26258
2019/0253743 A1 * 8/2019 Tanaka ................. H04N 21/812
2019/0356894 A1 * 11/2019 Oh .......................... G06F 3/011

FOREIGN PATENT DOCUMENTS

CN 106447788 A 2/2017
EP 3112985 A1 1/2017

OTHER PUBLICATIONS

T-REC-H.265-201612-S!!PDF-E Series H: Audiovisual and Multimedia Systems Infrastructure of audiovisual services—Coding of moving video-High efficiency video coding,Telecommunication Standardization Sector of ITU,dated Dec. 2016,total 664 pages.

* cited by examiner

METHOD AND CLIENT FOR PLAYING BACK PANORAMIC VIDEO

CROSS-REFERENCE TO RELATED APPLICATIONS

This application is a continuation of International Application No. PCT/CN2018/079033, filed on Mar. 14, 2018, which claims priority to Chinese Patent Application No. 201710179751.8, filed on Mar. 23, 2017. The disclosures of the aforementioned applications are hereby incorporated by reference in their entireties.

TECHNICAL FIELD

The present invention relates to the video processing field, and in particular, to a method and a client for playing back a panoramic video.

BACKGROUND

A panoramic video is also referred to as a 360-degree video, and means photographing an environment by using a plurality of camera lenses, compositing images corresponding to a plurality of angles into a panoramic video image by using technologies such as synchronization, splicing, and projection, and combining a plurality of frames of panoramic video images into a panoramic video. When viewing the panoramic video, a user may randomly change a viewing angle upwards, downwards, leftwards, or rightwards, to obtain better viewing experience.

The panoramic video includes information about a plurality of directions in a photographing environment, for example, the top, the bottom, the left, the right, the front, and the rear, and is limited to a field of view range (which is about 120 degrees) of human eyes and a field of view range of a display device (for example, currently, a field of view of a head-mounted device on the market is generally 96 degrees to 110 degrees). Therefore, when viewing the panoramic video, the user can actually view only content that corresponds to a small part of field of view and that is of the panoramic video. Usually, a region in which content actually viewed by the user currently is located in a panoramic video coordinate system is referred to as a user field of view. When viewing the panoramic video, the user can change the user field of view by dragging a mouse, turning the head, and the like, to view the panoramic video at different angles.

A client updates the user field of view in real time based on user interaction, and displays content in a corresponding region of the panoramic video. This brings the user with a higher degree of viewing freedom, but may also cause the user to miss some important/critical events. For example, when viewing a football match, the user is attracted to some episodes at the auditorium at a moment, and turns the head to the auditorium, but misses a goal on the court.

In the prior art, a server may identify, by using an image recognition technology (for example, object tracking), a region location at which a key event of the panoramic video occurs, generate a series of corresponding field of view information, and deliver the field of view information to the client. After receiving the field of view information (namely, a field of view recommended by the server) delivered by the server, the client automatically switches the user field of view to the recommended field of view, to display a corresponding key event.

Although the solution can prevent the user from missing a key event in a process of viewing the panoramic video, there are a series of disadvantages. First, the client automatically switches the user field of view of the user based on the recommended field of view delivered by the server. This causes sudden picture switching and affects user experience. In addition, because content corresponding to the recommended field of view is not necessarily content that the user is interested in, automatic switching interrupts previous viewing experience of the user and causes dislike to the user. For example, when the user views a football match, attention of the user is attracted to some episodes at the auditorium, and the user turns the head to the auditorium. At this moment, the user expects to know a user at the auditorium, and if the client forcibly switches to a goal picture, the user cannot view content that the user expects to view, and the user cannot freely select a field of view for viewing by the user. Consequently, user experience is reduced. In addition, this solution may cause confusion about a sense of space when the user views the panoramic video. For example, when the user wears a helmet to view the panoramic video, in a normal case, content on the left should be presented when the head of the user leans leftwards, so that the user has an immersive feeling. In this case, if a picture is suddenly switched to a recommended field of view that is on the right and that includes a key event, the head of the user leans leftwards, but the user actually views content on the right. This is contrary to the sense of space of the user.

SUMMARY

The present invention provides a method and a client for playing back a panoramic video, so that when playing back content corresponding to a user field of view, the client can intuitively indicate, to a user, occurrence of content corresponding to a recommended field of view, and the user can freely determine whether to switch a field of view.

To achieve the foregoing objective, the following technical solutions are used in embodiments of the present invention.

According to a first aspect, an embodiment of the present invention provides a method for playing back a panoramic video, including the following: A client obtains user field of view information and recommended field of view information of a panoramic video. The user field of view information is used to represent a user field of view of a user, that is, is used to represent a region in which content actually viewed by the user is located in a panoramic video coordinate system. When viewing the panoramic video, the user can change the user field of view by dragging a mouse, turning the head, and the like, to view the panoramic video at different angles. Usually, the client may obtain the view information of the user in real time based on user interaction. The recommended field of view information is used to represent a recommended field of view of the user, that is, is used to represent a region in which a key event is located in the panoramic video coordinate system. The recommended field of view is specified in advance by a panoramic video producer, or is identified by a server based on some technical means (for example, an image recognition technology such as object tracking). A manner of determining the recommended field of view is not limited in this embodiment of the present invention.

The client determines, based on the user field of view information and the recommended field of view information, that a field of view range corresponding to the recommended field of view is not within a field of view range corresponding to the user field of view. The client displays an image corresponding to the user field of view and an image corresponding to the recommended field of view.

In this embodiment of the present invention, in a panoramic video playback process, the client determines, based on whether the field of view range corresponding to the user field of view of the user includes the field of view range corresponding to the recommended field of view, whether the image corresponding to the recommended field of view also needs to be displayed while the image corresponding to the user field of view is displayed. In this way, the user is prevented from missing a key event that occurs within the field of view range corresponding to the recommended field of view, and a problem that the user has spatial-temporal confusion and flexibility of controlling the user field of view is reduced due to automatic field of view switching is also avoided.

The step of determining whether the field of view range corresponding to the recommended field of view is within the field of view range corresponding to the user field of view may be implemented in a plurality of manners based on different specific expression manners of the recommended field of view information and the user field of view information.

In a possible implementation, the user field of view information includes location information of the user field of view in a panoramic video image, and the recommended field of view information includes location information of the recommended field of view in the panoramic video image. For example, coordinate values of a field of view center may be used as the location information of each of the recommended field of view and the user field of view in the panoramic video image. Certainly, another location may be used, for example, an upper left corner or a lower right corner. The determining, by the client based on the user field of view information and the recommended field of view information, that a field of view range corresponding to the recommended field of view is not within a field of view range corresponding to the user field of view is specifically: determining a relative distance between the user field of view and the recommended field of view in the panoramic video image based on the location information of the user field of view in the panoramic video image and the location information of the recommended field of view in the panoramic video image; and when the relative distance is less than a preset threshold, determining that the field of view range corresponding to the user field of view includes the field of view range corresponding to the recommended field of view; or when the relative distance is not less than a preset threshold, determining that the field of view range corresponding to the user field of view does not include the field of view range corresponding to the recommended field of view.

Apparently, if the distance between the recommended field of view and the user field of view is larger, the two fields of view less likely overlap, and a key event that currently occurs less likely falls within the field of view range corresponding to the current user field of view. In this case, the image corresponding to the recommended field of view also needs to be displayed while the image corresponding to the user field of view is displayed, to prompt the user with occurrence of the key event.

In another possible implementation, the user field of view information includes location information of the user field of view in a panoramic video image and field of view magnitude information of the user field of view, and the recommended field of view information includes location information of the recommended field of view in the panoramic video image and field of view magnitude information of the recommended field of view. A field of view of a human is limited, and the field of view of the human is generally 90 degrees to 120 degrees. A coverage region (field of view range) of the field of view can be determined based on a location of the field of view and magnitude of the field of view. The determining, by the client based on the user field of view information and the recommended field of view information, that a field of view range corresponding to the recommended field of view is not within a field of view range corresponding to the user field of view is specifically: calculating display regions of the user field of view and the recommended field of view in a 2D plane based on the user field of view information and the recommended field of view information; determining a proportion of an overlapping area of the two display regions to the display region of the user field of view or the recommended field of view in the 2D plane, where preferably, a display region that corresponds to a field of view and that has a smaller area in the display regions of the user field of view and the recommended field of view in the 2D plane may be selected as an object for calculation; and when the proportion exceeds a preset threshold, determining that the field of view range corresponding to the user field of view includes the field of view range corresponding to the recommended field of view; or when the proportion does not exceed a preset threshold, determining that the field of view range corresponding to the user field of view does not include the field of view range corresponding to the recommended field of view.

Certainly, the user field of view and the recommended field of view each may be divided into a plurality of sub-regions in the 2D plane. Therefore, when the overlapping area is calculated, all the sub-regions need to be separately calculated.

If the overlapping part of the recommended field of view and the user field of view is smaller, a key event that currently occurs less likely falls within the field of view range corresponding to the current user field of view. In this case, the image corresponding to the recommended field of view also needs to be displayed while the image corresponding to the user field of view is displayed, to prompt the user with occurrence of the key event.

In another possible implementation, the user field of view information includes location information of the user field of view in a panoramic video image, and the recommended field of view information includes location information of the recommended field of view in the panoramic video image. In addition, the location information of each of the user field of view and the recommended field of view is represented by using angular coordinates. The determining, by the client based on the user field of view information and the recommended field of view information, that a field of view range corresponding to the recommended field of view is not within a field of view range corresponding to the user field of view is specifically: separately determining vectors from a sphere center to the user field of view and the recommended field of view; calculating an included angle between the two vectors; and when the included angle is less than a preset threshold, determining that the field of view range corresponding to the user field of view includes the field of view range corresponding to the recommended field of view; or when the included angle is not less than a preset threshold, determining that the field of view range corresponding to the user field of view does not include the field of view range corresponding to the recommended field of view.

In a process of viewing the panoramic video, in this embodiment of the present invention, a display location of the image corresponding to the recommended field of view is set, to provide the user with a most intuitive prompt, that is, to prompt the user with a specific key event that currently occurs in a specific direction at a current moment.

In a possible implementation, the client determines a relative location of the user field of view and the recommended field of view in the panoramic video image based on the user field of view information and the recommended field of view information; determines, based on the relative location, a display region of the image corresponding to the recommended field of view; and displays, in the display region, the image corresponding to the recommended field of view. The determining, based on the relative location, a display region of the image corresponding to the recommended field of view may be specifically: selecting an optimal display region from several predefined locations. For example, the recommended field of view can be displayed, by default, only at an upper left corner, an upper right corner, a lower left corner, and a lower right corner of the display region of the user field of view. If the recommended field of view is located on the left and the top of the user field of view, it is determined that the display region of the image corresponding to the recommended field of view is located at the upper left corner of the image corresponding to the user field of view. If the recommended field of view is located on the right and the bottom of the user field of view, it is determined that the display region of the image corresponding to the recommended field of view is located at the lower right corner of the image corresponding to the user field of view. Another case can be obtained by analogy. Certainly, a relative location may be calculated based on an actual included angle between the recommended field of view and the user field of view. For example, if the recommended field of view is located on the right of the user field of view, the display region of the image corresponding to the recommended field of view is located on the right of the image corresponding to the user field of view. Still further, a specific location that is of the display region of the image corresponding to the recommended field of view and that is on the right of the display region of the image corresponding to the user field of view is calculated based on an included angle between the recommended field of view and the user field of view in a vertical direction. In this embodiment of the present invention, the display region of the recommended field of view is determined based on the relative location of the user field of view and the recommended field of view in the panoramic video image, so that when the user expects to switch a field of view to the recommended field of view, the user can naturally switch to a direction of the display region based on a location of the display region of the recommended field of view. In particular, when the user wears a device such as a helmet, the relative location of the display region of the recommended field of view can be used to most intuitively prompt the user to switch the field of view.

In this embodiment of the present invention, that the client displays, in the display region, the image corresponding to the recommended field of view is also implemented in a plurality of manners based on whether the image corresponding to the recommended field of view and the image corresponding to the user field of view are displayed in a same playback window. In a possible implementation, the client superimposes, based on the display region, the image corresponding to the recommended field of view onto the image corresponding to the user field of view, and displays, in a current playback window, an image obtained after superimposition. In another possible implementation, the client displays, in a current playback window, the image corresponding to the user field of view; creates a recommended field of view playback window in the display region; and displays, in the recommended field of view playback window, the image corresponding to the recommended field of view, where the recommended field of view playback window is set above the user playback window.

In a process in which the user views the panoramic video, the user field of view may be constantly changing. In addition, one panoramic video may include a plurality of recommended fields of view, and different playback time correspond to different recommended fields of view. Therefore, a determining result of whether the field of view range corresponding to the recommended field of view is within the field of view range corresponding to the user field of view is also changing at any moment in the entire playback process.

The client may monitor a corresponding user interaction event, for example, the user drags a mouse or turns the head, to determine that the user field of view changes at a current moment. After the user field of view changes, the client obtains recommended field of view information corresponding to the current moment, and determines whether a field of view range corresponding to a recommended field of view at the current moment is within a field of view range corresponding to the changed user field of view. When the field of view range corresponding to the recommended field of view at the current moment is within the field of view range corresponding to the changed user field of view, the client does not display an image corresponding to the recommended field of view at the current moment.

Alternatively, the client may monitor a current playback time of the panoramic video, to determine that the recommended field of view changes at a current moment. After determining that the recommended field of view changes, the client obtains user field of view information corresponding to the current moment, and determines whether a field of view range corresponding to the changed recommended field of view is within a field of view range corresponding to a user field of view at the current moment. When the field of view range corresponding to the changed recommended field of view is within the field of view range corresponding to the user field of view at the current moment, the client does not display an image corresponding to the recommended field of view at the current moment.

In a possible implementation, the client further displays prompt information, to prompt the user to switch a field of view. The prompt information may be in a form of text or an image, for example, "double-click a left key on a remote control to directly switch to the recommended field of view", or an arrow, where the arrow points to a field of view switching direction.

According to a second aspect, an embodiment of the present invention further provides a client for playing back a panoramic video, where the client has a function of implementing behavior of the client in the first aspect. The function may be implemented by hardware, or may be implemented by hardware by executing corresponding software. The hardware or the software includes one or more modules corresponding to the function.

In a possible design, a structure of the client includes a processor and a memory. The memory is configured to store a program that supports the client in performing the foregoing method. The processor is configured to execute the program stored in the memory. The client may further include a communications interface that is used by the client to communicate with another device or a communications network.

According to a third aspect, an embodiment of the present invention further provides a computer program product. When being executed, the computer product is configured to perform the method that is described above and that is performed by the client.

According to a fourth aspect, an embodiment of the present invention further provides a computer readable storage medium, where the computer readable storage medium stores an instruction, and the instruction is used to perform the method that is described above and that is performed by the client.

According to the method for playing back a panoramic video provided above, in the panoramic video playback process, when presentation of the user field of view of the user is not affected, the image corresponding to the recommended field of view can be prompted and presented, so that the user independently determines to switch a field of view. Therefore, a degree of freedom for the user to independently switch the field of view and continuous playback of the image corresponding to the user field of view are ensured, and the user does not miss important content, thereby improving user experience.

DESCRIPTION OF EMBODIMENTS

The following describes the technical solutions in the embodiments of the present invention with reference to the accompanying drawings in the embodiments of the present invention.

To resolve the foregoing technical problem, the embodiments of the present invention provide a method and a client for playing back a panoramic video. The method and the client are based on a same invention concept. Because problem-resolving principles are similar, mutual reference may be made to implementation of the method and the client. No repeated description is provided.

Figure 1:
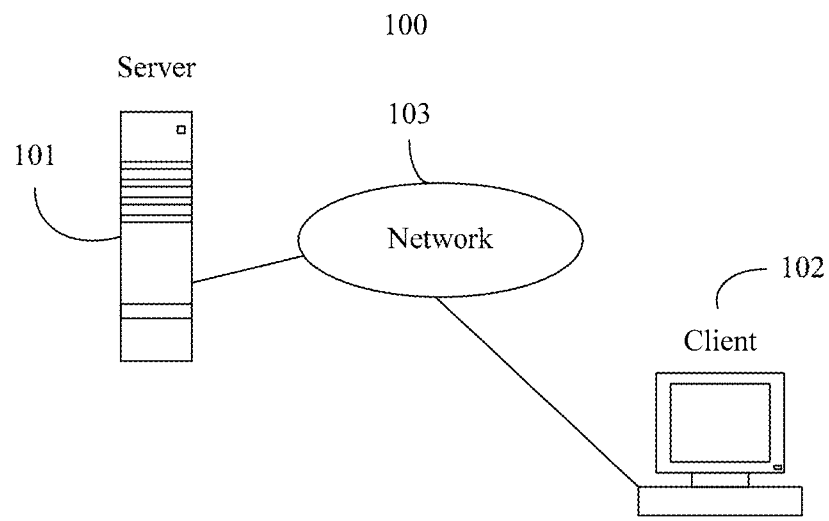
FIG. 1 is a schematic diagram of a network architecture according to an embodiment of the present invention.

A network architecture in the technical solutions provided in the embodiments of the present invention is shown in FIG. 1, and includes a server 101, a client 102, and a network 103. The client in the embodiments of the present invention has a function of playing back a panoramic video for a user. A panoramic video player is run on the client. The player may be an application installed on the client, or may be a page on a browser. The client may be a wireless terminal device or a wired terminal device. Specifically, the client may establish a communication connection to the server 101 by using the network 103, and obtain, from the server, information required for playing back the panoramic video. The wireless terminal device may be a handheld device with a wireless connection function, or another processing device connected to a wireless modem. The wireless terminal device may communicate with one or more core networks through a radio access network (RAN). The wireless terminal device may be a mobile terminal device such as a mobile phone (or referred to as a "cellular" phone) and a computer with a mobile terminal device. For example, the wireless terminal device may be a portable, pocket-sized, handheld, computer built-in, or in-vehicle mobile apparatus that exchanges voice and/or data with the radio access network. The wired terminal device may be a cable television, a wired computer, or the like. The server is a device that provides a panoramic video service. The server may be a single device, or may be a cluster that provides a panoramic video service. Specifically, the server in the embodiments of the present invention may respond to a service request from the client, and has a function of providing a panoramic video for the client. Composition of the server is similar to an architecture of a general-purpose computer, and generally includes a processor, a hard disk, a memory, a system bus, and the like. For example, the server may be a personal computer (PC) server. Communication between the client and the server supports a universal media transmission protocol of a panoramic video, for example, a real-time transport protocol (RTP), a real-time streaming protocol (RTSP), a hypertext transfer protocol (HTTP), a dynamic adaptive streaming over HTTP (DASH) media protocol, or an HTTP live streaming (HLS) media protocol.

The embodiments of the present invention relate to a panoramic video playback scenario, and specifically, to a scenario of how to display a recommended field of view on a client for a user.

The panoramic video is also referred to as a 360-degree panoramic video. The panoramic video is obtained by performing 360-degree panoramic photographing around by using a camera located at a center location. When viewing the panoramic video, the user changes a user field of view by sliding a screen or turning the head to move a helmet, a panoramic video playback picture may be automatically switched accordingly, and the user appears to be in a real environment. A basic process of producing and playing back a panoramic video may be briefly summarized as three phases: collection and encoding, content transmission, and decoding and rendering. The collection and encoding phase means that the server simultaneously collects different pictures around by using a plurality of lenses deployed at a same location, splices content photographed by the plurality of lenses, selects a proper projection type to perform projection processing on the spliced content, composites the spliced content into a panoramic video image, and then encodes the panoramic video image by using an existing encoder. The content transmission phase is a process in which the server sends a panoramic video to the client by using a media transmission protocol. The decoding and rendering phase means that the client first decodes and restores the panoramic video by using a decoder, to obtain the panoramic video image, performs 3D scene reconstruction on the panoramic video image based on the projection type, and then selects, based on a user field of view, a part of the panoramic video image obtained after 3D scene reconstruction, to project and present the part of image to the user.

In the embodiments of the present invention, the client obtains recommended field of view information of a panoramic video from the server, and determines, based on a location of an image corresponding to a recommended field of view in a panoramic video image and a location of an image corresponding to a user field of view in the panoramic video image, whether the image corresponding to the user field of view includes the image corresponding to the recommended field of view. When determining that the image corresponding to the recommended field of view is not within the image corresponding to the user field of view, the client displays the image corresponding to the user field of view and the image corresponding to the recommended field of view. Specifically, the client may display, in a picture in picture manner, the image corresponding to the user field of view and the image corresponding to the recommended field of view.

Related functions of the client 102 and the server 101 that are described above may be implemented by hardware such as an integrated circuit IC, or may be implemented by computer software by executing a corresponding computer program.

Figure 2:
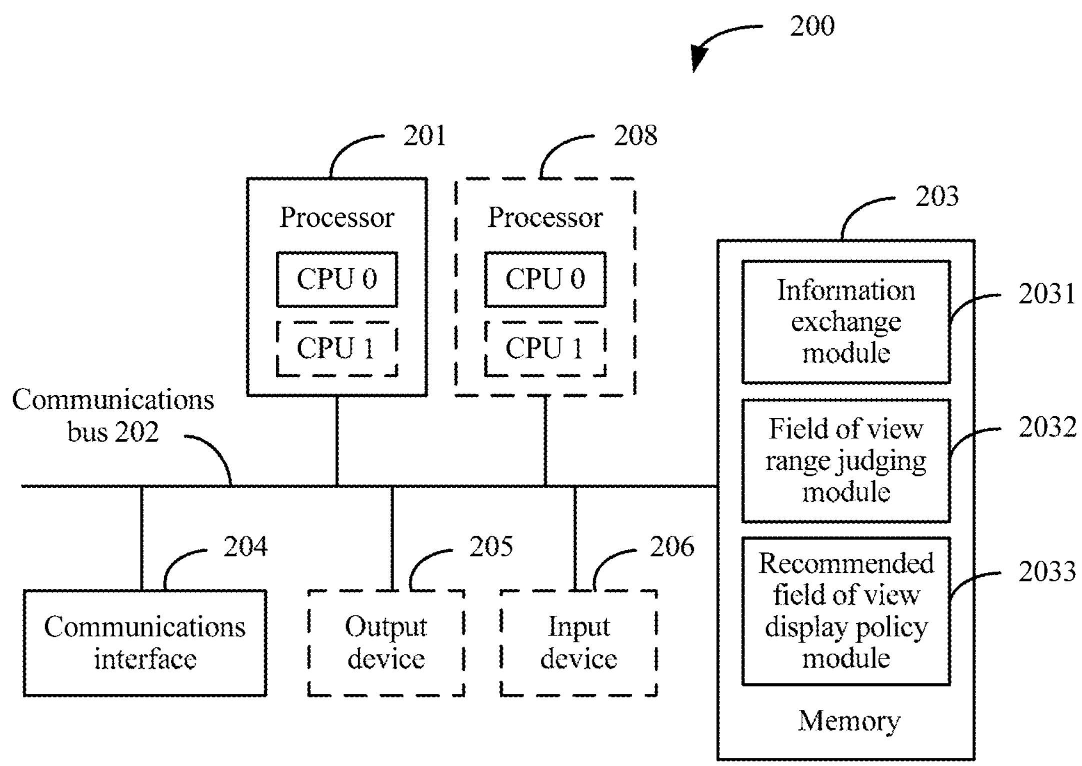
FIG. 2 is a structural diagram of hardware of a computer that performs a function of a client according to an embodiment of the present invention.

FIG. 2 shows a hardware structure of a computer for performing the function of the client 102 in the present invention. In this application, only implementation of the client 102 is used as an example. A computer function of the server 101 is also implemented in a same manner. A difference lies only in that different software code is stored in a memory. Specifically, a logic module and a function of the software code are described in the foregoing embodiment, and no repeated description is provided.

A computer device 200 includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits used to control program execution of the solutions in the present invention.

The communications bus 202 may include a channel used for transmitting information between the foregoing components.

The communications interface 204 is any apparatus such as a transceiver, and is configured to communicate with another device or a communications network such as the Ethernet, a radio access network (RAN), or a wireless local area network (WLAN).

The memory 203 may be a read-only memory (ROM) or another type of static storage device that can store static information and instructions, or a random access memory (RAM) or another type of dynamic storage device that can store information and instructions, or may be an electrically erasable programmable read only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 203 is not limited thereto. The memory may exist independently, and is connected to the processor by using the bus. Alternatively, the memory may be integrated with the processor.

The memory 203 is configured to store application program code for executing the solutions in the present invention. As shown in the figure, the memory 203 stores logic code corresponding to three function modules of the client 102, and the processor 201 controls execution of the code. The processor 201 is configured to execute the application program code stored in the memory 203, to implement a logical function of the client 102. An information exchange module 2031 is configured to exchange information with the server to obtain information required by the client in this embodiment of the present invention to play back a panoramic video. A field of view range judging module 2032 is configured to determine whether a field of view range corresponding to a recommended field of view is within a field of view range corresponding to a user field of view. A recommended field of view display policy module 2033 is configured to determine whether to display an image corresponding to the recommended field of view.

In implementation, in an embodiment, the processor 201 may include one or more CPUs such as a CPU 0 and a CPU 1 in FIG. 2.

In implementation, in an embodiment, the computer device 200 may include a plurality of processors such as the processor 201 and a processor 208 in FIG. 2. Each of the processors may be a single-core (single-CPU) processor, or may be a multi-core (multi-CPU) processor. The processor herein may be one or more devices, circuits, and/or processing cores used to process data (such as a computer program instruction).

In implementation, in an embodiment, the computer device 200 may further include an output device 205 and an input device 206. The output device 205 communicates with the processor 201, and may display information in a plurality of manners. The computer device 200 may be a general-purpose computer device or a dedicated computer device. In specific implementation, the computer device 200 may be a desktop computer, a portable computer, a network server, a palmtop computer (personal digital assistant, PDA), a mobile phone, a tablet computer, a wireless terminal device, a communications device, an embedded device, or a device having a structure similar to that shown in FIG. 2. A type of the computer device 200 is not limited in this embodiment of the present invention.

According to the method for playing back a panoramic video provided above, when presentation of a user field of view of a user is not affected, an image corresponding to a recommended field of view can be prompted and presented, so that the user independently determines whether to switch a field of view. Therefore, a degree of freedom for the user to independently switch the field of view and continuous playback of an image corresponding to the user field of view are ensured, and the user does not miss important content, thereby improving user experience.

With reference to the accompanying drawings, based on specific processes, for example, determining whether a field of view range corresponding to a user field of view includes a field of view range corresponding to a recommended field of view, determining a display region of an image corresponding to the recommended field of view, and entering and exiting the image corresponding to the recommended field of view, the following further describes the method for playing back a panoramic video provided in the embodiments of the present invention.

Figure 3:
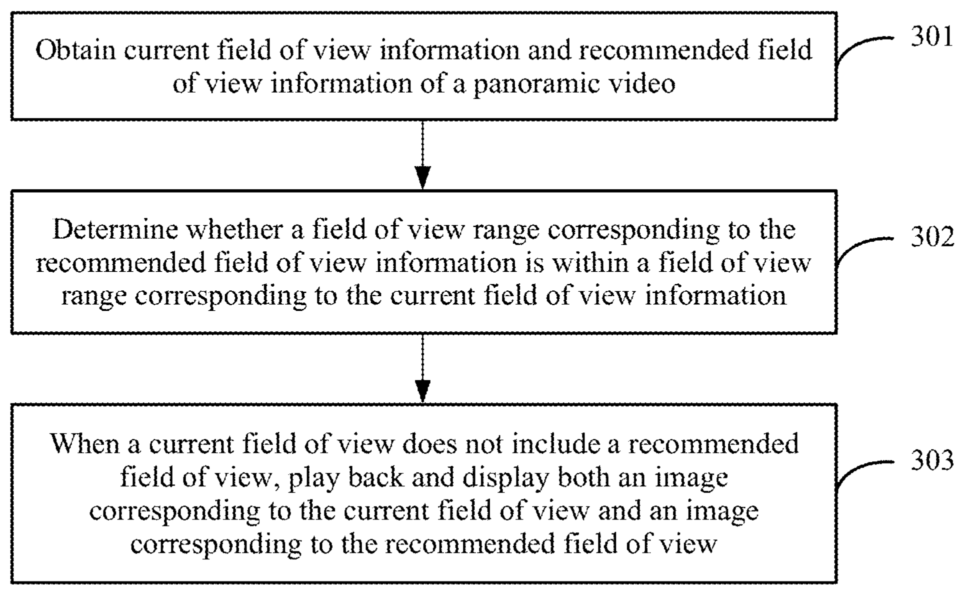
FIG. 3 is a flowchart of a method for playing back a panoramic video method according to an embodiment of the present invention.

FIG. 3 shows a method for playing back a panoramic video according to an embodiment of the present invention. The method includes the following steps.

301. A client obtains user field of view information and recommended field of view information of a panoramic video.

When viewing the panoramic video, a user can actually view only content that corresponds to a small part of field of view and that is of the panoramic video. Usually, a region in which content actually viewed by the user is located in a panoramic video coordinate system is referred to as a user field of view. The user field of view information is used to represent the user field of view of the user, that is, is used to represent the region in which the content actually viewed by the user is located in the panoramic video coordinate system. When viewing the panoramic video, the user can change the user field of view by dragging a mouse, turning the head, and the like, to view the panoramic video at different angles. Usually, the client may obtain the user field of view of the user in real time based on user interaction.

The recommended field of view information is used to represent a recommended field of view of the user, that is, is used to represent a region in which a key event is located in the panoramic video coordinate system. The recommended field of view is usually represented by using two-dimensional coordinates, or is represented by using magnitude of an angle of rotation. A method for representing the recommended field of view is described in the prior art in the industry, and a related person in the art may use any existing method in the art to represent the recommended field of view. The recommended field of view is specified in advance by a panoramic video producer, or is identified by a server based on some technical means (for example, an image recognition technology such as object tracking). A manner of determining the recommended field of view is not limited in this embodiment of the present invention.

It should be noted that, different fragments of the panoramic video may correspond to different recommended fields of view, or may correspond to a same recommended field of view. This is not limited in this embodiment of the present invention. The recommended field of view information may be located in a video fragment, and is downloaded to the client locally together with the video fragment. When parsing the video fragment, the client extracts the corresponding recommended field of view information. Alternatively, the recommended field of view information may not be stored together with a video fragment. For example, the recommended field of view information may be stored in a DASH MPD (Media Presentation Description, MPD) file, and the client downloads the MPD file and extracts the corresponding recommended field of view information. The MPD file includes a download address of the video fragment of the panoramic video and the corresponding recommended field of view information.

In some embodiments, if the recommended field of view information is not stored in the video fragment, an association relationship between recommended field of view information and a video fragment needs to be established. In one implementation, the recommended field of view information may further include indication information of the video fragment corresponding to the recommended field of view, for example, an identifier of the video fragment. In another implementation, the recommended field of view information may further include time information corresponding to the recommended field of view, namely, a time period that is in the panoramic video and to which the recommended field of view information is applicable. For example, the recommended field of view information may include a start time and an end time that correspond to the recommended field of view.

For example, in a panoramic video playback process, for example, when the panoramic video is played back at the first second, the client obtains user field of view information and recommended field of view information of the user at a current moment (namely, at the first second in the panoramic video).

302. The client determines, based on the user field of view information and the recommended field of view information, whether a field of view range corresponding to the recommended field of view is within a field of view range corresponding to the user field of view.

When the recommended field of view is within the field of view range corresponding to the user field of view, the user does not miss key/important information when the client displays the panoramic video to the user by using the user field of view. However, when the recommended field of view is not within the field of view range corresponding to the user field of view, the user may miss key/important information when the client displays the panoramic video to the user only by using the user field of view.

That the client determines whether a field of view range corresponding to the recommended field of view is within a field of view range corresponding to the user field of view may be implemented in a plurality of manners. The manners are described in the following embodiments of the present invention.

It should be noted that, the client may determine, through timing determining or real-time monitoring, whether the field of view range corresponding to the recommended field of view is within the field of view range corresponding to the user field of view. Details are as follows:

When the client uses the timing determining manner, the client may perform determining at an interval of a preset time period, for example, perform determining at an interval of 2 seconds. Further, before determining whether the field of view range corresponding to the recommended field of view is within the field of view range corresponding to the user field of view, the client may first determine, based on a current playback time of the panoramic video, whether a recommended field of view exists at the current playback time of the panoramic video. If no recommended field of view exists at the current playback time of the panoramic video, the client considers, by default, that the field of view range corresponding to the recommended field of view is within the field of view range corresponding to the user field of view; or if a recommended field of view exists at the current playback time of the panoramic video, the client determines, based on a corresponding method, whether the field of view range corresponding to the recommended field of view is within the field of view range corresponding to the user field of view.

When the client uses the real-time monitoring manner, the client monitors changes of the user field of view and the recommended field of view. Only when the user field of view and the recommended field of view changes, the client re-determines whether the field of view range corresponding to the recommended field of view is within the field of view range corresponding to the user field of view.

303. Based on a determining result in step 302, if the field of view range corresponding to the recommended field of view is within the field of view range corresponding to the user field of view, display, based on the prior art, an image corresponding to the user field of view; or if the field of view range corresponding to the recommended field of view is not within the field of view range corresponding to the user field of view, while displaying an image corresponding to the user field of view, the client plays back and displays an image corresponding to the recommended field of view.

In some embodiments, when the field of view range corresponding to the recommended field of view is not within the field of view range corresponding to the user field of view, the image corresponding to the recommended field of view is superimposed onto a display region of the user field of view in a manner similar to a picture in picture manner. Certainly, another manner may be used, for example, the images corresponding to the two fields of view are displayed side by side or up and down.

For the step that while displaying an image corresponding to the user field of view, the client plays back and displays the image corresponding to the recommended field of view, there are a plurality of possible implementations. The following describes the implementations in this embodiment of the present invention.

In this embodiment of the present invention, in the panoramic video playback process, the client determines, based on whether the field of view range corresponding to the user field of view of the user includes the field of view range corresponding to the recommended field of view, whether the image corresponding to the recommended field of view also needs to be displayed while the image corresponding to the user field of view is displayed. In this way, the user is prevented from missing a key event that occurs within the field of view range corresponding to the recommended field of view, and a problem that the user has spatial-temporal confusion and flexibility of controlling the user field of view is reduced due to automatic field of view switching is also avoided.

Figure 4A:
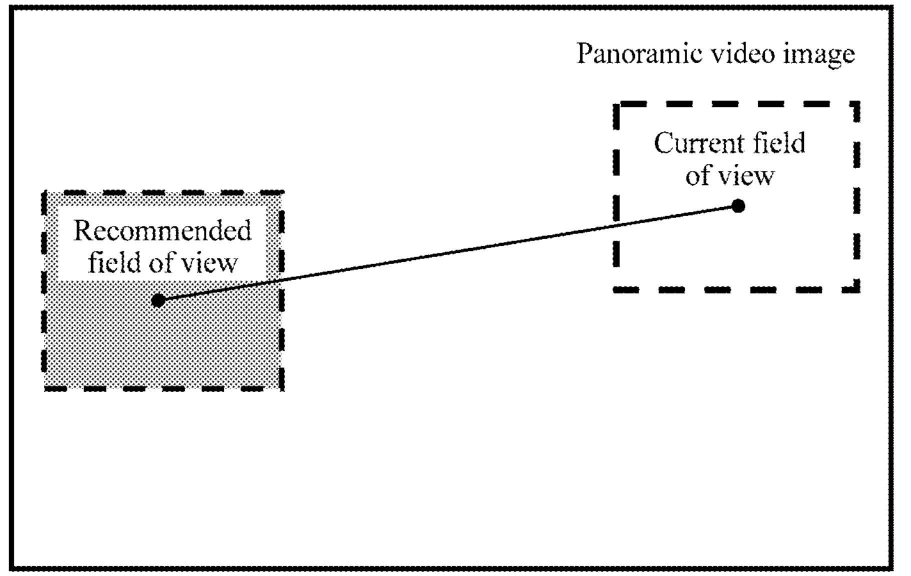
FIG. 4A is an example diagram of determining whether a field of view range corresponding to a recommended field of view is within a field of view range corresponding to a user field of view according to an embodiment of the present invention.
Figures 4B, 4C:
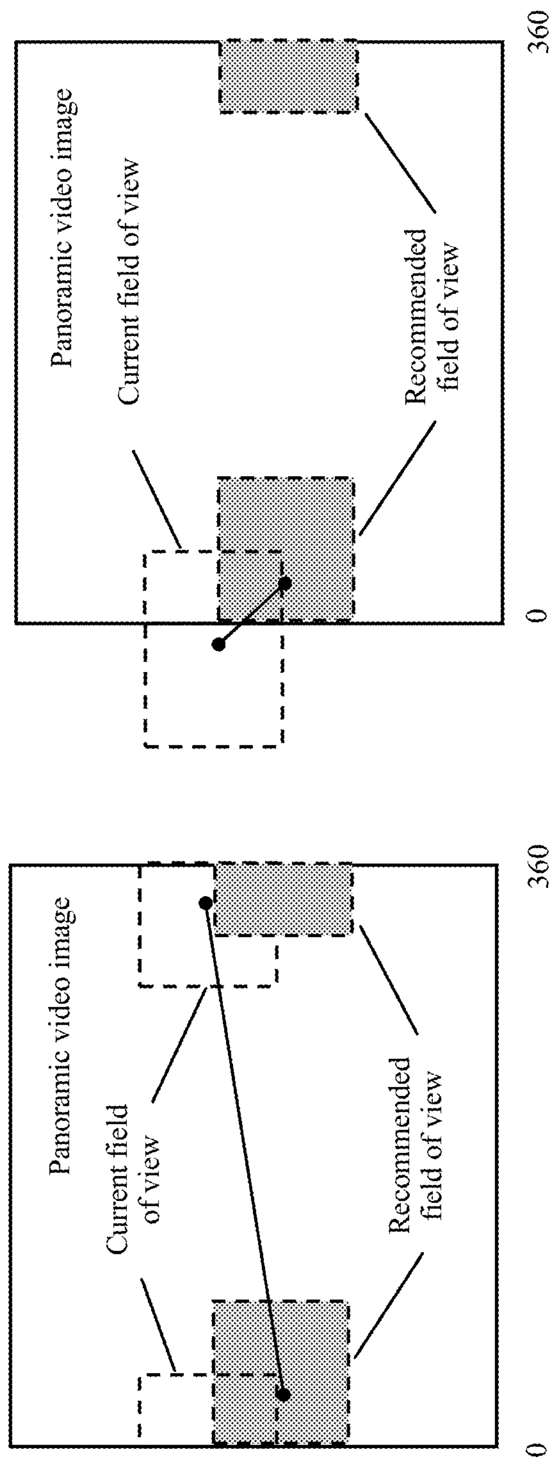
FIG. 4B is an example diagram of determining whether a field of view range corresponding to a recommended field of view is within a field of view range corresponding to a user field of view according to another embodiment of the present invention.
FIG. 4C is an example diagram of determining whether a field of view range corresponding to a recommended field of view is within a field of view range corresponding to a user field of view according to another embodiment of the present invention.

FIG. 4A to FIG. 4F are example diagrams of determining whether a field of view range corresponding to a recommended field of view is within a field of view range corresponding to a user field of view according to an embodiment of the present invention. Details are as follows:

Method 1. As shown in FIG. 4A to FIG. 4C, determination is performed based on a distance between the user field of view and the recommended field of view.

When the method is used, the user field of view information and the recommended field of view information respectively include location information of the user field of view in a panoramic video image and location information of the recommended field of view in the panoramic video image. For example, coordinate values of a field of view center may be used as the location information of each of the recommended field of view and the user field of view in the panoramic video image. Certainly, another location may be used, for example, an upper left corner or a lower right corner.

The location information of the user field of view in the panoramic video image and the location information of the recommended field of view in the panoramic video image are determined based on the user field of view information and the recommended field of view information. A relative distance between the user field of view and the recommended field of view in the panoramic video image is calculated. If the distance between the two fields of view is less than a threshold such as 30 degrees, it is determined that the field of view range corresponding to the user field of view includes the field of view range corresponding to the recommended field of view. If the distance between the two fields of view is not less than a threshold, it is determined that the field of view range corresponding to the user field of view does not include the field of view range corresponding to the recommended field of view.

It should be noted that, because the panoramic video is discontinuous from left to right and from top to bottom in a 2D plane, it may be inaccurate to directly determine the distance based on a reference point (for example, the coordinate values of the field of view center). As shown in FIG. 4B, a center point of the user field of view and a center point of the recommended field of view are respectively located on a left edge and a right edge of the 2D plane, and are far away from each other in space. In this case, it may be mistakenly considered that the field of view range corresponding to the user field of view does not include the field of view range corresponding to the recommended field of view. A solution is as follows: When it is determined that a field of view is divided into a plurality of sub-regions in the 2D plane because a reference point of the field of view is located on the right side of the 2D plane, the reference point of the field of view is shifted leftwards by 360 degrees, and then the distance between reference points of the two fields of view is calculated (for example, it is assumed that a horizontal coordinate of the center point of the user field of view in FIG. 4B is 350 degrees, and as shown in FIG. 4C, a coordinate obtained after the shift is ~10 degrees).

Figures 4D, 4E:
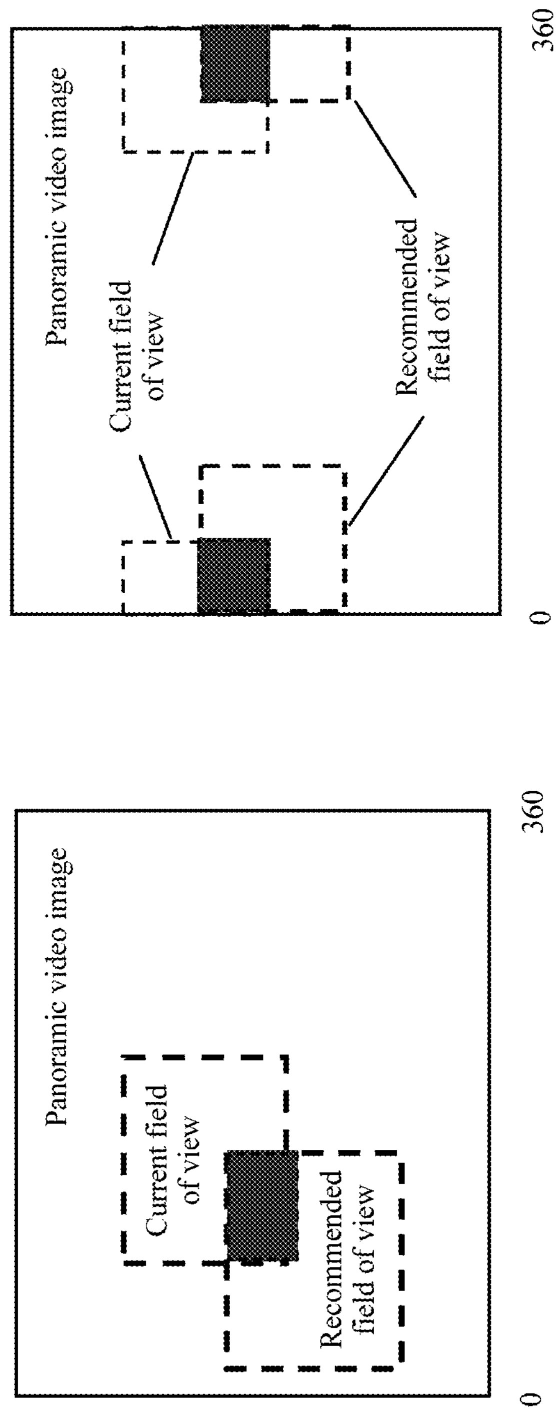
FIG. 4D is an example diagram of determining whether a field of view range corresponding to a recommended field of view is within a field of view range corresponding to a user field of view according to another embodiment of the present invention.
FIG. 4E is an example diagram of determining whether a field of view range corresponding to a recommended field of view is within a field of view range corresponding to a user field of view according to another embodiment of the present invention.

Method 2: As shown in FIG. 4D and FIG. 4E, determining is performed based on a size of an overlapping region of the user field of view and the recommended field of view.

When the method is used, the user field of view information and the recommended field of view information respectively include location information of the user field of view in a panoramic video image and location information of the recommended field of view in the panoramic video image, and corresponding field of view magnitude information.

As shown in FIG. 4D, first, display regions of the user field of view and the recommended field of view in a 2D plane are calculated based on the location information (for example, coordinate values of a field of view center) of the user field of view and the recommended field of view and the corresponding field of view magnitude information. Then, an overlapping area of the two display regions (as shown by a black part in FIG. 4D, the calculation formula is described in the prior art, and details are not described herein again) is calculated. A proportion of the overlapping area to an area of the display region of the user field of view or the recommended field of view in the 2D plane is calculated (preferably, a display region that has a smaller area in the display regions of the user field of view and the recommended field of view in the 2D plane is selected as an object for calculation). If the proportion exceeds a threshold such as 80%, it is determined that the field of view range corresponding to the user field of view includes the field of view range corresponding to the recommended field of view. If the proportion does not exceed a threshold, it is determined that the field of view range corresponding to the user field of view does not include the field of view range corresponding to the recommended field of view.

Certainly, the user field of view and the recommended field of view each may be divided into a plurality of sub-regions (as shown in FIG. 4E) in the 2D plane. Therefore, when the overlapping area is calculated, all the sub-regions need to be separately calculated.

Figure 4F:
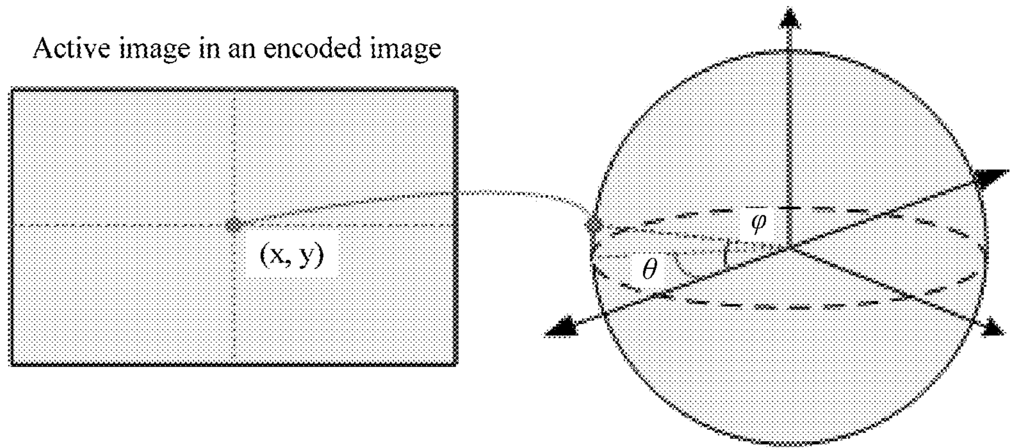
FIG. 4F is an example diagram of determining whether a field of view range corresponding to a recommended field of view is within a field of view range corresponding to a user field of view according to another embodiment of the present invention.

Method 3: As shown in FIG. 4F, determining is performed based on an included angle between the user field of view and the recommended field of view.

When the method is used, the user field of view information and the recommended field of view information respectively include location information of the user field of view in a panoramic video image and location information of the recommended field of view in the panoramic video image.

A difference between Method 3 and Method 1 is as follows: In Method 1, the location information of each of the user field of view and the recommended field of view is represented by using 2D planar coordinates, and in Method 3, the location information of each of the user field of view and the recommended field of view is represented by using angular coordinates. As shown in FIG. 4F, a relationship between 2D planar coordinates (x, y) and corresponding spherical angular coordinates ($\theta$, $\varphi$) is represented. Mapping from the 2D plane coordinates to the angular coordinates is described in the prior art, and details are not described herein again.

When angular coordinates are used to represent location information of a field of view, vectors (as shown by a red line in FIG. 4F) from a sphere center to locations of a current field of view and the recommended field of view may be separately calculated. Then, an included angle between the two vectors is calculated. When the included angle is less than a threshold, it is determined that the field of view range corresponding to the user field of view includes the field of view range corresponding to the recommended field of view. When the included angle is not less than a threshold, it is determined that the field of view range corresponding to the user field of view does not include the field of view range corresponding to the recommended field of view.

Figure 5A:
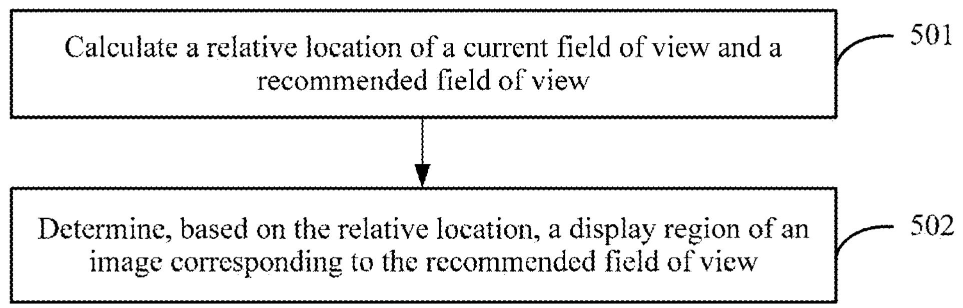
FIG. 5A is a flowchart of determining a location of an image corresponding to a recommended field of view relative to an image corresponding to a user field of view according to an embodiment of the present invention.

In this embodiment of the present invention, when the client determines that the field of view range corresponding to the recommended field of view is not within the field of view range corresponding to the user field of view, while displaying the image corresponding to the user field of view, the client plays back and displays the image corresponding to the recommended field of view. In a possible implementation, as shown in FIG. 5A, a location of the image corresponding to the recommended field of view relative to the image corresponding to the user field of view may be determined by using the following embodiment.

501. Calculate a relative location of the user field of view and the recommended field of view in the panoramic video image.

The relative location means whether the recommended field of view is located on the left, the right, the top, or the bottom of the user field of view in the panoramic video image. For example, an included angle between the user field of view to the recommended field of view may be calculated based on an angle of rotation of the user field of view and an angle of rotation of the recommended field of view. If the included angle is less than 180 degrees leftwards in a horizontal direction, it is determined that the recommended field of view is on the left of the user field of view. If the included angle is not less than 180 degrees leftwards in a horizontal direction, it is determined that the recommended field of view is on the right of the user field of view. If the included angle is less than 180 degrees upwards in a vertical direction, it is determined that the recommended field of view is on the top of the user field of view. If the included angle is not less than 180 degrees upwards in a vertical direction, it is determined that the recommended field of view is on the bottom of the user field of view.

502. Determine, based on the relative location of the user field of view and the recommended field of view in the panoramic video image, a display region of the image corresponding to the recommended field of view.

A manner is to select an optimal display region from several predefined locations. For example, the recommended field of view can be displayed, by default, only at an upper left corner, an upper right corner, a lower left corner, and a lower right corner of the display region of the user field of view. If the recommended field of view is located on the left and the top of the user field of view, it is determined that the display region of the image corresponding to the recommended field of view is located at the upper left corner of the image corresponding to the user field of view. If the recommended field of view is located on the right and the bottom of the user field of view, it is determined that the display region of the image corresponding to the recommended field of view is located at the lower right corner of the image corresponding to the user field of view. Another case can be obtained by analogy.

Figure 5B:
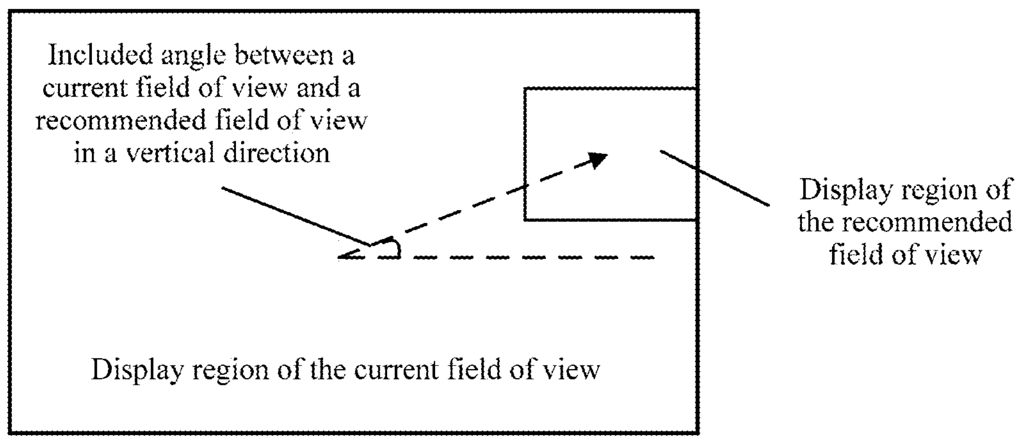
FIG. 5B is a schematic diagram of determining a location of an image corresponding to a recommended field of view relative to an image corresponding to a user field of view according to another embodiment of the present invention.

In another implementation, a relative location is calculated based on an actual included angle between the recommended field of view and the user field of view. For example, as shown in FIG. 5B, if the recommended field of view is located on the right of the user field of view, the display region of the image corresponding to the recommended field of view is located on the right of the image corresponding to the user field of view. Still further, a specific location that is of the display region of the image corresponding to the recommended field of view and that is on the right of the display region of the image corresponding to the user field of view is calculated based on an included angle between the recommended field of view and the user field of view in a vertical direction.

In this embodiment of the present invention, the display region of the recommended field of view is determined based on the relative location of the user field of view and the recommended field of view in the panoramic video image, so that when the user expects to switch a field of view to the recommended field of view, the user can naturally switch to a direction of the display region based on a location of the display region of the recommended field of view. In particular, when the user wears a device such as a helmet, the relative location of the display region of the recommended field of view can be used to most intuitively prompt the user to switch the field of view.

It should be noted that in this embodiment of the present invention, when the client determines that the field of view range corresponding to the recommended field of view is not within the field of view range corresponding to the user field of view, while displaying the image corresponding to the user field of view, the client plays back and displays the image corresponding to the recommended field of view. Specifically, this may be implemented in the following manners:

Method 1: After determining the display region of the image corresponding to the recommended field of view by using the method described in FIG. 5A and FIG. 5B, the client composites the image corresponding to the user field of view and the image corresponding to the recommended field of view. Specifically, if a picture in picture display manner is used, the client scales down, based on a percentage, the image corresponding to the recommended field of view, and then pastes an image obtained through scaling down to a corresponding location of the image corresponding to the user field of view, to generate a composite image. If the two images are arranged side by side or up and down, scaling is performed, based on a size of an arrangement region, on each of the image corresponding to the user field of view and the image corresponding to the recommended field of view, and then a new image is obtained through paste based on an arrangement location. The client locally displays a composite image.

Method 2. Different from Method 1, in Method 2, the client does not need to perform image composition, but uses two independent playback windows to separately display the image corresponding to the user field of view and the image corresponding to the recommended field of view. The client determines, by using the method described in FIG. 5A and FIG. 5B, the display region of the image corresponding to the recommended field of view, and sets a window corresponding to the recommended field of view at the location of the display region of the image corresponding to the recommended field of view. If a picture in picture manner is used, the window corresponding to the recommended field of view also needs to be set above the image corresponding to the user field of view.

When displaying the image corresponding to the user field of view and the image corresponding to the recommended field of view, the client may further display other text or image prompt information, for example, text that prompts the user how to quickly switch to the recommended field of view (for example, "double-click a left key on a remote control to directly switch to the recommended field of view"), or display prompt information of the location of the recommended field of view (for example, when the recommended field of view is on the left, a leftward arrow is displayed).

The foregoing embodiment mainly describes a case in which there is only one recommended field of view at the same time, and a person skilled in the art may easily extend the case to a case in which there are a plurality of recommended fields of view at the same time. In this case, the client needs to generate a corresponding image for each of the plurality of recommended fields of view, and composite the image corresponding to the user field of view and images corresponding to the plurality of recommended fields of view, or generate playback windows of the plurality of recommended fields of view.

Figure 6:
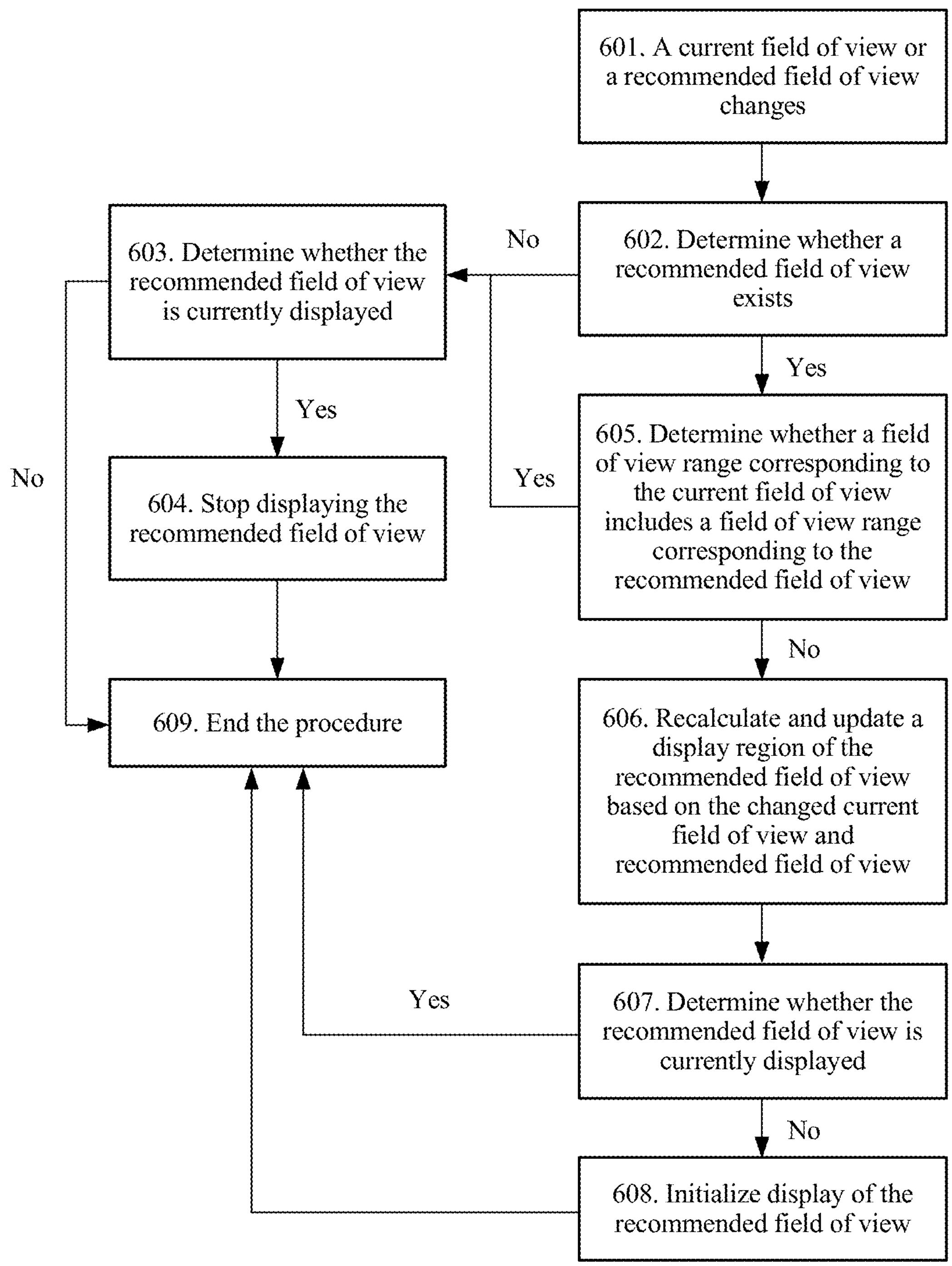
FIG. 6 is a flowchart of a method for playing back a panoramic video when a user field of view or a recommended field of view changes according to another embodiment of the present invention.

As a panoramic video is played back, a user field of view or a recommended field of view of a user in a viewing process changes. For example, when the user changes a direction of a helmet, a determining result of whether a field of view range corresponding to the user field of view includes a field of view range corresponding to the recommended field of view is also changing. When the field of view range corresponding to the user field of view includes the field of view range corresponding to the recommended field of view, an image corresponding to the recommended field of view is not displayed. When the field of view range corresponding to the user field of view does not include the field of view range corresponding to the recommended field of view, an image corresponding to the recommended field of view is displayed based on the method provided in the foregoing embodiment. Specifically, as shown in FIG. 6, a method for playing back a panoramic video when a user field of view or a recommended field of view changes is provided, and includes the following steps.

601. A client determines whether a user field of view or a recommended field of view changes, and when the user field of view or the recommended field of view changes, performs the following procedure.

The user field of view usually changes due to user interaction, for example, the user drags a mouse or turns the head. Therefore, the client only needs to monitor a corresponding user interaction event. When the foregoing event occurs, the client calculates a new user field of view and invokes the following processing procedure.

The recommended field of view usually changes due to a time change. For example, a recommended field of view 1 is used in a time period from 0 seconds to 30 seconds of a panoramic video, and a recommended field of view 2 is used in a time period from 31 seconds to 60 seconds of a panoramic video. Different playback time periods correspond to different recommended fields of view. The client may periodically (for example, every 2 seconds) obtain a current playback time, obtain corresponding recommended field of view information based on the current playback time, and determine whether the recommended field of view of the user changes relative to a recommended field of view in a previous determining period. In addition, the client may also monitor an interaction event related to a playback time change, for example, dragging a progress bar. When detecting a corresponding event, the client obtains anew playback time and corresponding recommended field of view information in real time, and determines whether the recommended field of view of the user changes relative to a recommended field of view existing before the event occurs. If the recommended field of view changes, the client invokes the following processing procedure.

602. Determine whether a recommended field of view exists at a current playback moment of the panoramic video; and if no recommended field of view exists, go to step 603; or if a recommended field of view exists, go to step 605.

603. Determine whether an image corresponding to the recommended field of view is currently displayed.

In some embodiments, a register may be disposed in the client. In a panoramic video playback process, if the image corresponding to the recommended field of view is also displayed while an image corresponding to the user field of view is displayed, a value of the register is set to 1. On the contrary, in a panoramic video playback process, if the image corresponding to the recommended field of view is not displayed while an image corresponding to the user field of view is displayed, a value of the register is set to 0. The client may determine, by reading the value of the register, whether the user displays the image corresponding to the recommended field of view.

604. Stop displaying the recommended field of view, and go to step 609.

In some embodiments, the client further needs to store a display status of the recommended field of view of the user as a non-display state. For example, when the register in step 603 exists, the value of the register further needs to be set to 0.

If the images corresponding to the two fields of view are displayed in the foregoing image composition manner, the stopping displaying the recommended field of view includes: instructing an image generation module to stop generating the image corresponding to the recommended field of view, stopping invoking image combination, and directly displaying the image corresponding to the user field of view.

If the images corresponding to the two fields of view are displayed by using two independent playback windows, the stopping displaying the recommended field of view includes: instructing an image generation module to stop generating the image corresponding to the recommended field of view, and closing a playback window corresponding to the recommended field of view, or setting a playback window corresponding to the recommended field of view to a hidden mode.

605. Determine whether a field of view range corresponding to the user field of view includes a field of view range corresponding to the recommended field of view; and if the field of view range corresponding to the user field of view includes the field of view range corresponding to the recommended field of view, go to step 603; or if the field of view range corresponding to the user field of view does not include the field of view range corresponding to the recommended field of view, go to step 606.

606. Determine, based on the changed user field of view and recommended field of view, a display region of an image corresponding to the recommended field of view.

A method of this step is the same as the method described in the embodiment in FIG. 5A and FIG. 5B, and details are not described herein again.

607. Determine whether the image corresponding to the recommended field of view is currently displayed; and if the image corresponding to the recommended field of view is currently displayed, go to step 609; or if the image corresponding to the recommended field of view is currently not displayed, go to step 608.

This step is the same as step 603. Details are not described herein again.

608. Initialize display of the recommended field of view.

If the images corresponding to the two fields of view are displayed in the foregoing image composition manner, the initializing display of the recommended field of view includes: instructing an image generation module to generate the image corresponding to the recommended field of view, invoking an image composition module to perform image composition, and displaying a composite image.

If the images corresponding to the two fields of view are displayed by using two independent playback windows, the initializing display of the recommended field of view includes: instructing an image generation module to generate the image corresponding to the recommended field of view, and creating a new playback window and outputting the generated image corresponding to the recommended field of view to the playback window, or setting a hidden playback window corresponding to the recommended field of view to a display mode.

Optionally, the client further needs to store a display status of the recommended field of view of the user as a display state. For example, when the register in step 603 exists, the value of the register further needs to be set to 1.

609. End the procedure.

It should be noted that, the foregoing steps are not all necessary to implement the method for playing back a panoramic video provided in this embodiment of the present invention. For example, step 602 is optional. Step 602 is added, so that when determining that no recommended field of view exists at the current moment, the client directly proceeds to step 603, to avoid performing step 605, thereby improving running performance of the client. When step 602 is not included in the embodiment shown in FIG. 6, an execution result of step 605 is "yes" by default.

Figures 7A, 7B, 7C:
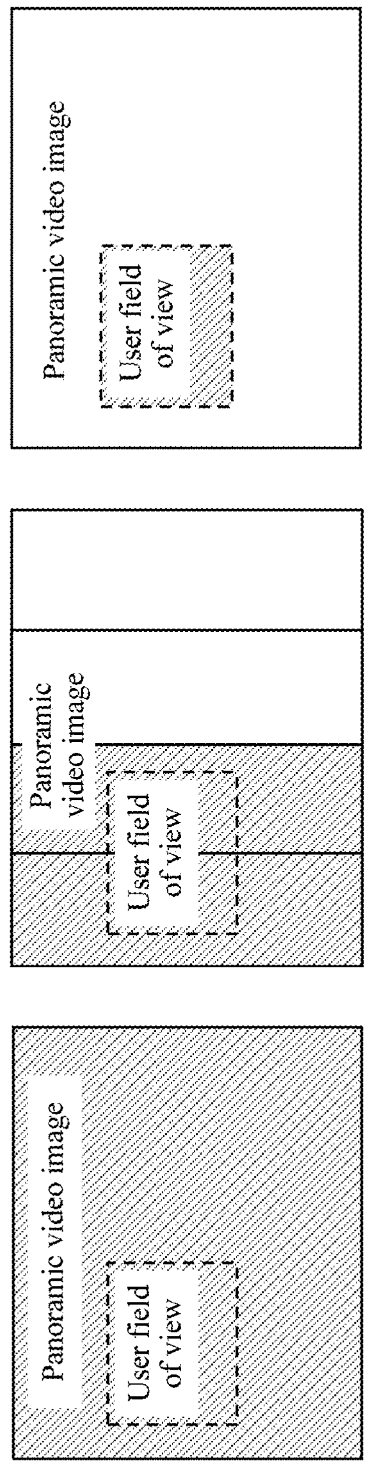
FIG. 7A is a schematic diagram of full-frame-based transmission according to an embodiment of the present invention.
FIG. 7B is a schematic diagram of tile-based transmission according to an embodiment of the present invention.
FIG. 7C is a schematic diagram of field-of-view-based transmission according to an embodiment of the present invention.

With reference to different content transmission manners, the following specifically describes the method for playing back a panoramic video provided in the embodiments of the present invention. Specifically, an existing method for transmitting content of a panoramic video usually includes a full-frame-based transmission manner, a tile-based transmission manner, and a field-of-view-based transmission manner. Full-frame-based transmission means that a server encodes a panoramic video image in a video encoding form such as H.264/H.265 and transmits the image. The client receives a complete panoramic video image. The panoramic video image includes an image corresponding to any field of view, including an image corresponding to a user field of view and an image corresponding to a recommended field of view (as shown in FIG. 7A). Tile-based transmission means that a panoramic video image in a panoramic video (one panoramic video includes a plurality of panoramic video images) is divided into a plurality of tiles (tile) according to a predetermined rule, and each tile of image is independently encoded, to generate a plurality of video fragments. During transmission, only a video fragment of a corresponding tile is transmitted based on a user field of view (FOV). The user field of view may fall on one or more tiles (as shown in FIG. 7B, the user field of view falls on two tiles: a tile 1 and a tile 2). The client receives video fragments of one or more tiles, and the client does not obtain a video fragment corresponding to another field of view. Field-of-view-based transmission means that the client reports a current user field of view of a user in real time. The server generates a video fragment in a corresponding region based on the user field of view, and transmits the video fragment to the client. The client receives the video fragment corresponding to the user field of view. A difference between field-of-view-based transmission and tile-based transmission can be learned from FIG. 7B and FIG. 7C. In implementation, field-of-view-based transmission requires the server to perform encoding in real time based on the user field of view reported by the client, to generate a video fragment corresponding to the user field of view, and send the video fragment to the client.

FIG. 7A, FIG. 7B, and FIG. 7C are successively schematic diagrams of the full-frame-based transmission manner, the tile-based transmission manner, and the field-of-view-based transmission manner. A shaded part represents transmitted content. It can be learned from definitions of the three types of content transmission and the example described in FIG. 7A/FIG. 7B/FIG. 7C that, when the panoramic video is transmitted through full-frame-based transmission, in a process of viewing the panoramic video, a video fragment obtained by the user from the server each time is a panoramic video image that includes images corresponding to all fields of view, and this consumes a relatively large quantity of network resources (bandwidth, traffic, and the like). However, when the method for playing back a panoramic video provided in the embodiments of the present invention is used, when the image corresponding to the recommended field of view needs to be displayed, there is no need to request the image corresponding to the recommended field of view from the server again, and the image corresponding to the recommended field of view may be directly obtained from the panoramic video image based on recommended field of view information, thereby reducing a display delay of the image corresponding to the recommended field of view.

Figure 8:
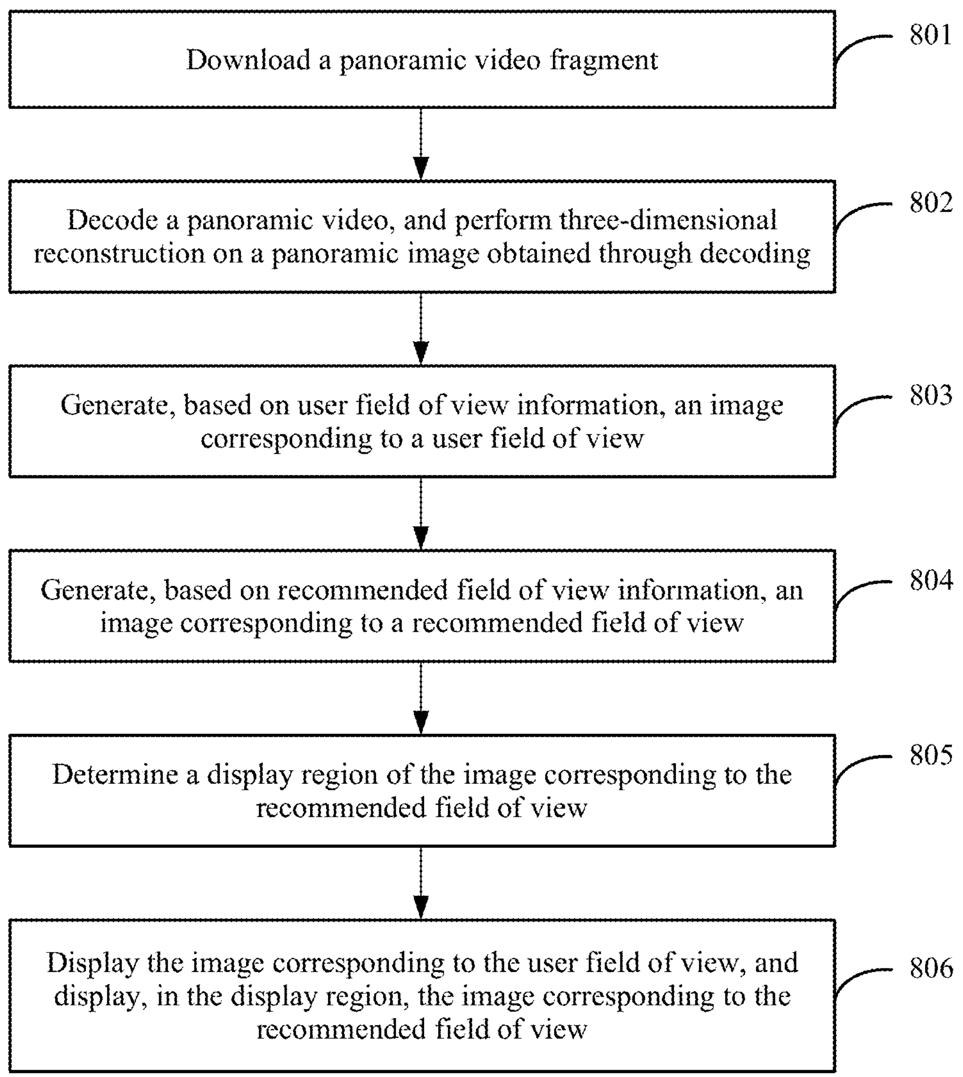
FIG. 8 is a flowchart of a method for playing back a panoramic video in a full-frame-based transmission manner according to an embodiment of the present invention.

FIG. 8 is a flowchart of a method for playing back a panoramic video in a full-frame-based transmission manner according to an embodiment of the present invention. Because a download method and a playback method are the same as those in the prior art when a field of view range corresponding to a user field of view includes a field of view range corresponding to a recommended field of view, the following embodiment describes only a processing procedure existing when the field of view range corresponding to the user field of view does not include the field of view range corresponding to the recommended field of view, and the processing procedure includes the following steps.

801. A client downloads a panoramic video fragment.

The panoramic video fragment includes a panoramic video image, that is, includes images corresponding to all fields of view.

802. The client decodes a panoramic video, and performs, in a projection format of the panoramic video, three-dimensional reconstruction on a panoramic video image obtained through decoding.

Common projection formats include spherical projection, cube projection, triangular pyramid projection, and the like. The three-dimensional reconstruction means pasting a 2D panoramic video image to a corresponding 3D model. For example, when spherical projection is used, the panoramic video image needs to be pasted to an inner surface of a sphere. The three-dimensional reconstruction process is described in the prior art, and details are not described herein again.

803. The client generates, based on user field of view information, an image corresponding to a user field of view.

Usually, a perspective projection manner is used to convert the image corresponding to the user field of view in a three-dimensional model into a 2D image. Certainly, a person skilled in the art may generate, in another manner, the image corresponding to the user field of view. This part belongs to the prior art, and details are not described herein again.

804. The client generates, based on recommended field of view information, an image corresponding to a recommended field of view.

A specific generation method is the same as the method for generating the image corresponding to the user field of view.

805. The client determines a display region of the image corresponding to the recommended field of view.

For a method in which the client determines the display region of the image corresponding to the recommended field of view, a related method in the foregoing embodiment may be used. Details are not described herein again.

806. Display the image corresponding to the user field of view, and display, in the display region, the image corresponding to the recommended field of view.

After determining the display region of the image corresponding to the recommended field of view, while displaying the image corresponding to the user field of view, the client may play back and display the image corresponding to the recommended field of view by using the method in the foregoing embodiment. A specific method is not described herein again.

Figure 9:
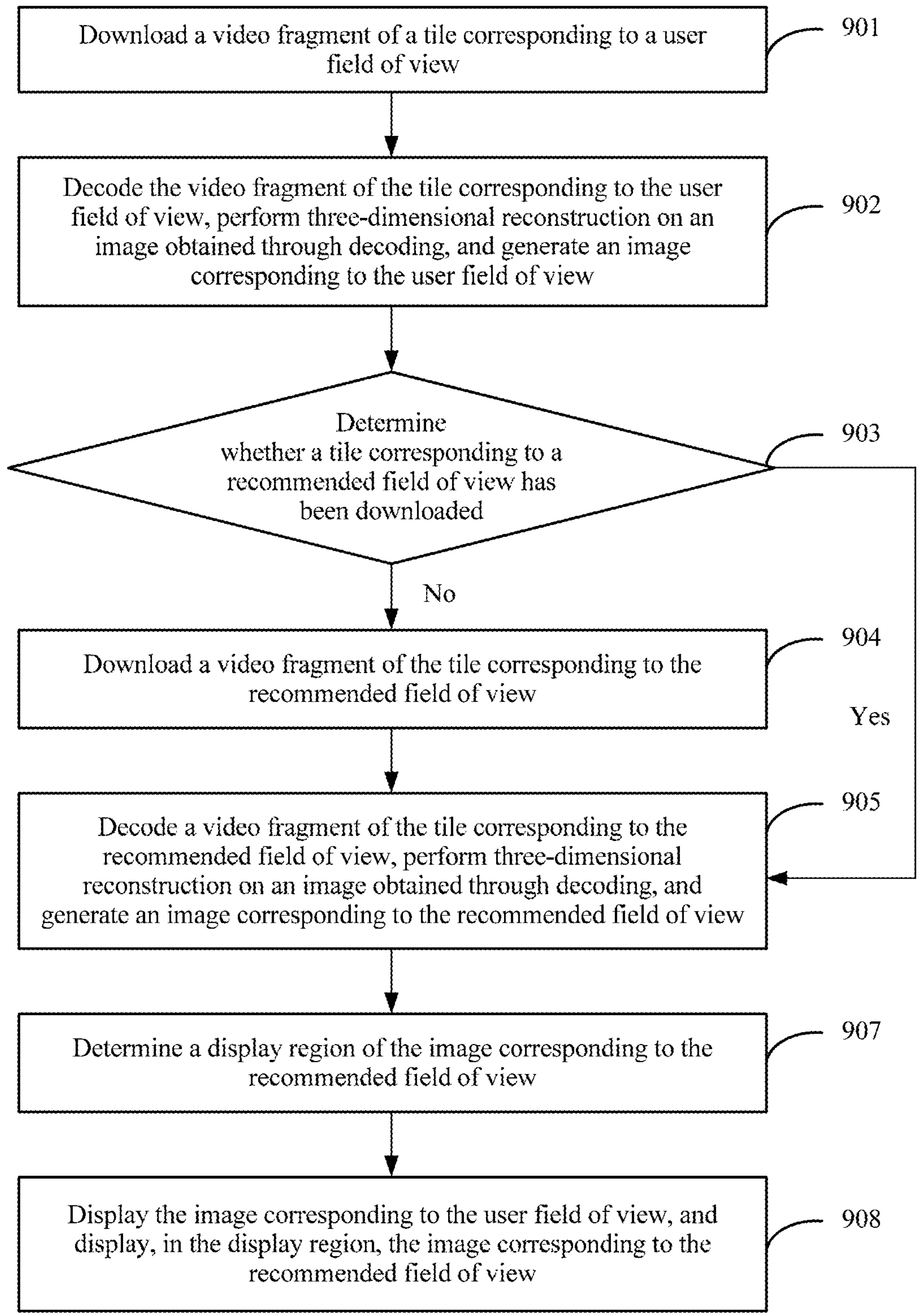
FIG. 9 is a flowchart of a method for playing back a panoramic video in a tile-based transmission manner according to an embodiment of the present invention.

FIG. 9 is a flowchart of a method for playing back a panoramic video in a tile-based transmission manner according to an embodiment of the present invention. Because a download method and a playback method are the same as those in the prior art when a field of view range corresponding to a user field of view includes a field of view range corresponding to a recommended field of view, the following embodiment describes only a processing procedure existing when the field of view range corresponding to the user field of view does not include the field of view range corresponding to the recommended field of view, and the processing procedure includes the following steps.

901. A client downloads a video fragment of a tile corresponding to a user field of view.

902. The client decodes the video fragment of the tile corresponding to the user field of view, performs three-dimensional reconstruction on an image obtained through decoding, and generates, based on user field of view information, an image corresponding to the user field of view.

903. The client determines whether a tile corresponding to a recommended field of view has been downloaded; and when the tile corresponding to the recommended field of view has been downloaded, proceeds to step 905; or when the tile corresponding to the recommended field of view is not downloaded, proceeds to step 904.

It can be learned from FIG. 7B that the tile corresponding to the user field of view may be the same as or partially the same as the tile corresponding to the recommended field of view. In this case, a corresponding video fragment does not need to be repeatedly downloaded.

904. The client downloads a video fragment of the tile corresponding to the recommended field of view.

In some embodiments, the client may determine whether the tile corresponding to the recommended field of view includes video fragments with a plurality of bit rates or a plurality of resolutions. When the tile corresponding to the recommended field of view includes video fragments with a plurality of bit rates or a plurality of resolutions, the client selects a video fragment with a low bit rate or a low resolution for downloading. In a picture-in-picture mode, an image corresponding to the recommended field of view is scaled down and then displayed. Therefore, a video fragment with a high bit rate or a high resolution does not need to be downloaded, thereby reducing an amount of downloaded data.

905. The client decodes a video fragment of the tile corresponding to the recommended field of view, performs three-dimensional reconstruction on an image obtained through decoding, and generates, based on recommended field of view information, an image corresponding to the recommended field of view.

906. The client determines a display region of the image corresponding to the recommended field of view (referring to step 805).

907. Display the image corresponding to the user field of view, and display, in the display region, the image corresponding to the recommended field of view (referring to step 806).

Figure 10:
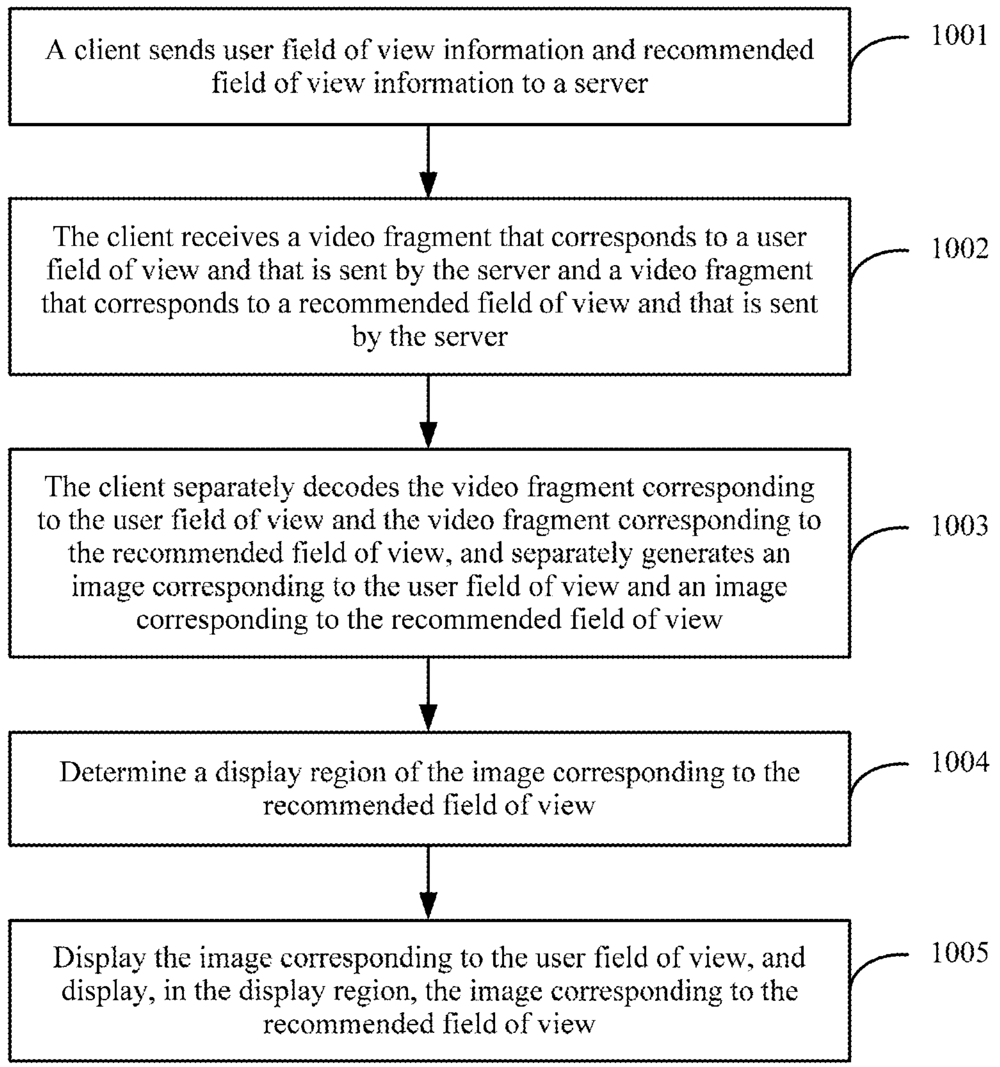
FIG. 10 is a flowchart of a method for playing back a panoramic video in a field-of-view-based transmission manner according to an embodiment of the present invention.

FIG. 10 is a flowchart of a method for playing back a panoramic video in a field-of-view-based transmission manner according to an embodiment of the present invention. Because a download method and a playback method are the same as those in the prior art when a field of view range corresponding to a user field of view includes a field of view range corresponding to a recommended field of view, the following embodiment describes only a processing procedure existing when the field of view range corresponding to the user field of view does not include the field of view range corresponding to the recommended field of view, and the processing procedure includes the following steps.

1001. A client reports user field of view information and recommended field of view information to a server.

1002. The client receives a video fragment that corresponds to a user field of view and that is sent by the server and a video fragment that corresponds to a recommended field of view and that is sent by the server.

The server generates, in real time based on the user field of view information, the video fragment corresponding to the user field of view. The server may generate, in real time based on the recommended field of view information uploaded by the client, the video fragment corresponding to the recommended field of view. However, a quantity of recommended fields of view and a time point of a panoramic video are fixed, and the recommended field of view information is delivered by the server to the client. Therefore, in another implementation, the server may parse the recommended field of view information of the panoramic video in advance, and then generate a corresponding video fragment and store the video fragment locally, without generating the video fragment in real time. In this case, when the server receives the recommended field of view information uploaded by the client, the server searches for the corresponding video fragment based on the recommended field of view information, and delivers the corresponding video fragment.

1003. The client separately decodes the video fragment corresponding to the user field of view and the video fragment corresponding to the recommended field of view, and separately generates an image corresponding to the user field of view and an image corresponding to the recommended field of view.

1004. The client determines a display region of the image corresponding to the recommended field of view (referring to step 805).

1005. Display the image corresponding to the user field of view, and display, in the display region, the image corresponding to the recommended field of view (referring to step 806).

Figure 11:
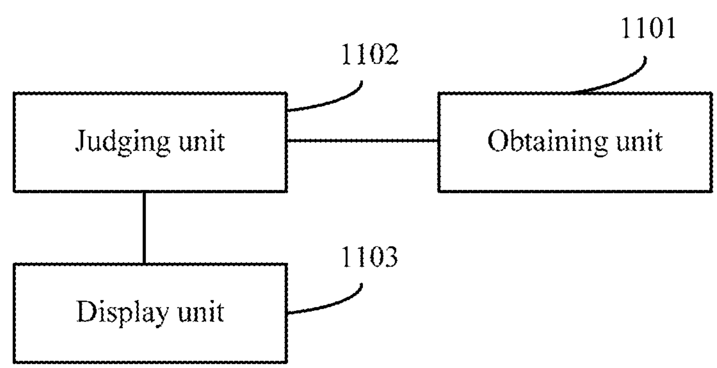
FIG. 11 is a schematic structural diagram of a client for playing back a panoramic video according to an embodiment of the present invention.

An embodiment of the present invention further describes a schematic structural diagram of a client that belongs to a same invention concept as the foregoing method embodiments. As shown in FIG. 11, the client 1100 is configured to perform a function of the client in the foregoing method embodiments in FIG. 3 to FIG. 10, and includes an obtaining unit 1101, a judging unit 1102, and a display unit 1103.

The obtaining unit 1101 is configured to obtain user field of view information and recommended field of view information of a panoramic video.

The judging unit 1102 is configured to determine, based on the user field of view information and the recommended field of view information, that a field of view range corresponding to a recommended field of view is not within a field of view range corresponding to a user field of view.

The display unit 1103 is configured to display an image corresponding to the user field of view and an image corresponding to the recommended field of view.

When the user field of view information includes location information of the user field of view in a panoramic video image, and the recommended field of view information includes location information of the recommended field of view in the panoramic video image, that the judging unit 1102 is configured to determine, based on the user field of view information and the recommended field of view information, that a field of view range corresponding to a recommended field of view is not within a field of view range corresponding to a user field of view is specifically: determining a relative distance between the user field of view and the recommended field of view in the panoramic video image based on the location information of the user field of view in the panoramic video image and the location information of the recommended field of view in the panoramic video image; and when the relative distance is less than a preset threshold, determining that the field of view range corresponding to the user field of view includes the field of view range corresponding to the recommended field of view; or when the relative distance is not less than a preset threshold, determining that the field of view range corresponding to the user field of view does not include the field of view range corresponding to the recommended field of view.

When the user field of view information includes location information of the user field of view in a panoramic video image and field of view magnitude information of the user field of view, and the recommended field of view information includes location information of the recommended field of view in the panoramic video image and field of view magnitude information of the recommended field of view, that the judging unit 1102 is configured to determine, based on the user field of view information and the recommended field of view information, that a field of view range corresponding to a recommended field of view is not within a field of view range corresponding to a user field of view is specifically: calculating display regions of the user field of view and the recommended field of view in a 2D plane based on the user field of view information and the recommended field of view information; determining a proportion of an overlapping area of the two display regions to the display region of the user field of view or the recommended field of view in the 2D plane; and when the proportion exceeds a preset threshold, determining that the field of view range corresponding to the user field of view includes the field of view range corresponding to the recommended field of view; or when the proportion does not exceed a preset threshold, determining that the field of view range corresponding to the user field of view does not include the field of view range corresponding to the recommended field of view.

When the user field of view information includes location information of the user field of view in a panoramic video image, and the recommended field of view information includes location information of the recommended field of view in the panoramic video image, that the judging unit 1102 is configured to determine, based on the user field of view information and the recommended field of view information, that a field of view range corresponding to a recommended field of view is not within a field of view range corresponding to a user field of view is specifically: separately determining vectors from a sphere center to the user field of view and the recommended field of view; calculating an included angle between the two vectors; and when the included angle is less than a preset threshold, determining that the field of view range corresponding to the user field of view includes the field of view range corresponding to the recommended field of view; or when the included angle is not less than a preset threshold, determining that the field of view range corresponding to the user field of view does not include the field of view range corresponding to the recommended field of view.

Optionally, the client further includes a determining unit, configured to: before the display unit 1103 displays the image corresponding to the user field of view and the image corresponding to the recommended field of view, determine a relative location of the user field of view and the recommended field of view in the panoramic video image based on the user field of view information and the recommended field of view information. That the display unit 1103 is configured to display an image corresponding to the user field of view and an image corresponding to the recommended field of view is specifically: determining, based on the relative location, a display region of the image corresponding to the recommended field of view; and displaying, in the display region, the image corresponding to the recommended field of view.

In a possible implementation, that the display unit 1103 is configured to display, in the display region, the image corresponding to the recommended field of view specifically includes: superimposing, based on the display region, the image corresponding to the recommended field of view onto the image corresponding to the user field of view; and displaying an image obtained after superimposition; or displaying, in a current playback window, the image corresponding to the user field of view; creating a recommended field of view playback window in the display region; and displaying, in the recommended field of view playback window, the image corresponding to the recommended field of view, where the recommended field of view playback window is set above the user playback window.

In some embodiments, the client further includes a monitoring unit, configured to determine that the user field of view changes at a current moment. The obtaining unit 1101 is further configured to obtain recommended field of view information corresponding to the current moment. The judging unit 1102 is further configured to determine whether a field of view range corresponding to a recommended field of view at the current moment is within a field of view range corresponding to the changed user field of view. The display unit 1103 is further configured to: when the field of view range corresponding to the recommended field of view at the current moment is within the field of view range corresponding to the changed user field of view, skip displaying an image corresponding to the recommended field of view at the current moment.

Optionally, the client further includes a monitoring unit, configured to determine that the recommended field of view changes at a current moment. The obtaining unit 1101 is further configured to obtain user field of view information corresponding to the current moment. The judging unit 1102 is further configured to determine whether a field of view range corresponding to the changed recommended field of view is within a field of view range corresponding to a user field of view at the current moment. The display unit 1103 is further configured to: when the field of view range corresponding to the changed recommended field of view is within the field of view range corresponding to the user field of view at the current moment, skip displaying an image corresponding to the recommended field of view at the current moment.

In a possible implementation, the display unit 1103 is further configured to display prompt information, where the prompt information is used to prompt a user to switch a field of view.

In this embodiment, the client 1100 is presented in a form of a function unit. The "unit" herein may be an application-specific integrated circuit (ASIC), a circuit, a processor and a memory that execute one or more software or firmware programs, an integrated logic circuit, and/or another component that can provide the foregoing functions. In a simple embodiment, a person skilled in the art may figure out that the client 1100 may use the form shown in FIG. 2. The obtaining unit 1101, the judging unit 1102, the display unit 1103, the determining unit, and the monitoring unit may be implemented by using the processor and the memory in FIG. 2. Specifically, the obtaining unit 1101 may be implemented by executing the information exchange module 2031 by the processor. The judging unit 1102, the determining unit, and the monitoring unit may be implemented by executing the field of view range judging module 2032 by the processor. The display unit 1103 may be implemented by executing the recommended field of view display policy module 2033 by the processor.

An embodiment of the present invention further provides a computer storage medium. The computer storage medium is configured to store a computer software instruction for implementing the methods for playing back a panoramic video shown in FIG. 3 to FIG. 10, and includes a program designed to perform the foregoing method embodiments. The stored program may be executed to implement the method for playing back a panoramic video provided in the embodiments of the present invention.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

Although the present invention is described with reference to the embodiments, in a process of implementing the present invention that claims protection, a person skilled in the art may understand and implement another variation of the disclosed embodiments by viewing the accompanying drawings, disclosed content, and the accompanying claims.

In the claims, "comprising (comprising)" does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with other hardware, or may be distributed in another form, for example, by using the Internet or another wired or wireless telecommunications system.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specified function in one or more processes in the flowcharts and/or in one or more blocks in the block diagrams.

These computer program instructions may be stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although the present invention is described with reference to specific features and the embodiments thereof, apparently, various modifications and combinations may be made to them without departing from the scope of the present invention. Correspondingly, the specification and accompanying drawings are merely example descriptions of the present invention defined by the accompanying claims, and are considered as any of or all modifications, variations, combinations or equivalents that cover the scope of the present invention. Apparently, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for playing back a panoramic video, comprising obtaining, by a client device, information regarding a current user field of view of a panoramic video and information regarding recommended field of view of the panoramic video;

determining, by the client device based on the current user field of view information and the recommended field of view information, that a field of view range corresponding to the recommended field of view is not within a range of the current user field of view;

determining, by the client device, a relative location of the current user field of view and the recommended field of view in the image of the panoramic video based on the current user field of view information and the recommended field of view information;

displaying, in a first display window, the image corresponding to the user field of view;

determining, by the client device, based on the relative location and the first display window, a display region of a second display window;

creating the second display window in the display region; and displaying, in the second display window, the image with the recommended field of view, wherein the second display window is set above the first display window and the image with the recommended field of view in the second display window is content of the panoramic video.

2. The method according to claim 1, wherein the user field of view information comprises location information of the user field of view in an image of the panoramic video, and the recommended field of view information comprises location information of the recommended field of view in the image of the panoramic video; and, wherein determining, by the client device, based on the user field of view information and the recommended field of view information, that the field of view range corresponding to the recommended field of view is not within the range of the user field of view comprises:

determining a relative distance between the user field of view and the recommended field of view in the image of the panoramic video based on the location information of the user field of view in the image of the panoramic video and the location information of the recommended field of view in the image of the panoramic video;

when the relative distance is less than a preset threshold, determining that the range of the user field of view comprises the field of view range within the recommended field of view; and when the relative distance is not less than the preset threshold, determining that the range of the user field of view does not comprise the field of view range within the recommended field of view.

3. The method according to claim 1, wherein the user field of view information comprises location information of the user field of view in the image of the panoramic video and field of view magnitude information of the user field of view, and the recommended field of view information comprises location information of the recommended field of view in the image of the panoramic video and field of view magnitude information of the recommended field of view and, wherein determining, by the client based on the user field of view information and the recommended field of view information, that the field of view range corresponding to the recommended field of view is not within the range of the user field of view comprises:

calculating display regions of the user field of view and the recommended field of view in a 2 dimensional (2D) plane based on the user field of view information and the recommended field of view information;

determining a proportion of an overlapping area of the two display regions to the display region of the user field of view or to the recommended field of view in the 2D plane; and when the proportion exceeds a preset threshold, determining that the range of the user field of view comprises the field of view range within the recommended field of view; and when the proportion does not exceed the preset threshold, determining that the range of the user field of view does not comprise the field of view range within the recommended field of view.

4. The method according to claim 1, wherein the user field of view information comprises location information of the user field of view in a panoramic video image, and the recommended field of view information comprises location information of the recommended field of view in the panoramic video image; and, wherein determining, by the client device, based on the user field of view information and the recommended field of view information, that the field of view range corresponding to the recommended field of view is not within the range of the user field of view comprises:

separately determining vectors from a sphere center to the user field of view and the recommended field of view;

calculating an included angle between two vectors;

when the included angle is less than a preset threshold, determining that the range of the user field of view comprises the field of view range within the recommended field of view; and when the included angle is not less than the preset threshold, determining that the range of the user field of view does not comprise the field of view range within the recommended field of view.

5. The method according to claim 1, wherein the method further comprises:

determining that the user field of view changes at a current moment;

obtaining recommended field of view information corresponding to the current moment;

determining whether a field of view range corresponding to the recommended field of view at the current moment is within a field of view range corresponding to the changed user field of view; and when the field of view range within the recommended field of view at the current moment is within the field of view range corresponding to the changed user field of view, skipping displaying an image within the recommended field of view at the current moment.

6. The method according to claim 1, wherein the method further comprises:

determining that the recommended field of view changes at a current moment;

obtaining user field of view information corresponding to the current moment;

determining whether a field of view range corresponding to the changed recommended field of view is within a field of view range corresponding to the user field of view at the current moment; and when the field of view range corresponding to the changed recommended field of view is within the field of view range corresponding to the user field of view at the current moment, skipping displaying an image within the recommended field of view at the current moment.

7. The method according to claim 1, wherein the method further comprises:

displaying, by the client device, prompt information, wherein the prompt information is configured to prompt a user to switch a field of view.

8. A client device for playing back a panoramic video, comprising a processor and memory, wherein the memory is configured to store a computer readable program; and the processor is configured to execute the computer readable program in the memory to cause the client device to:

obtain information regarding a current user field of view of a panoramic video and information regarding a recommended field of view of the panoramic video;

determine, based on the current user field of view information and recommended field of view information, that a field of view range corresponding to the recommended field of view is not within a range of the current user field of view;

determine a relative location of the current user field of view and the recommended field of view in the image of the panoramic video based on the current user field of view information and the recommended field of view information;

display, in a first display window, the image corresponding to the user field of view;

determine, based on the relative location and the first display window, a display region of a second display window;

create the second display window in the display region; and display, in the second display window, the image within the recommended field of view, wherein the second display window is set above the first display window and the image with the recommended field of view in the second display window is content of the panoramic video.

9. The client device according to claim 8, wherein the user field of view information comprises location information of the user field of view in an image of the panoramic video, and the recommended field of view information comprises location information of the recommended field of view in the image of the panoramic video; and, wherein determining, based on the user field of view information and the recommended field of view information, that the field of view range corresponding to the recommended field of view is not within the range of the user field of view comprises:

determining a relative distance between the user field of view and the recommended field of view in the image of the panoramic video based on the location information of the user field of view in the panoramic video image and the location information of the recommended field of view in the panoramic video image;

when the relative distance is less than a preset threshold, determining that the range of the user field of view comprises the field of view range within the recommended field of view; and when the relative distance is not less than the preset threshold, determining that the range of the user field of view does not comprise the field of view range within the recommended field of view.

10. The client device according to claim 8, wherein the user field of view information comprises location information of the user field of view in an image of the panoramic video and field of view magnitude information of the user field of view, and the recommended field of view information comprises location information of the recommended field of view in the image of the panoramic video and field of view magnitude information of the recommended field of view; and, wherein determining, based on the user field of view information and the recommended field of view information, that the field of view range corresponding to a recommended field of view is not within the of the user field of view comprises:

calculating display regions of the user field of view and the recommended field of view in a 2 dimensional (2D) plane based on the user field of view information and the recommended field of view information;

determining a proportion of an overlapping area of the two display regions to the display region of the user field of view or to the recommended field of view in the 2D plane;

when the proportion exceeds a preset threshold, determining that the range of the user field of view comprises the field of view range within the recommended field of view; and when the proportion does not exceed the preset threshold, determining the range of the user field of view does not comprise the field of view range within the recommended field of view.

11. The client device according to claim 8, wherein the user field of view information comprises location information of the field of view in an image of the panoramic video, and the recommended field of view information comprises location information of the recommended field of view in the image of the panoramic video; and, wherein determining, based on the user field of view information and the recommended field of view information, that the field of view range corresponding to the recommended field of view is not within the range of the user field of view:

separately determining vectors from a sphere center to the user field of view and the recommended field of view;

calculating an included angle between two vectors;

when the included angle is less than a preset threshold, determining that the range of the user field of view comprises the field of view range within the recommended field of view; and when the included angle is not less than the preset threshold, determining that the range of the user field of view does not comprise the field of view range within the recommended field of view.

12. The client device according to claim 8, wherein the client device is further caused to:

determine that the user field of view changes at a current moment;

obtain recommended field of view information corresponding to the current moment;

determine whether a field of view range corresponding to the recommended field of view at the current moment is within the range of the changed user field of view; and when the field of view range within the recommended field of view at the current moment is within the field of view range corresponding to the changed user field of view, skipping displaying an image within the recommended field of view at the current moment.

13. The client device according to claim 8, wherein the client device is further caused to:

determine that the recommended field of view changes at a current moment;

obtain user field of view information corresponding to the current moment;

determine whether a field of view range corresponding to the changed recommended field of view is within a field of view range corresponding to the user field of view at the current moment; and when the field of view range corresponding to the changed recommended field of view is within the field of view range corresponding to the user field of view at the current moment, skipping displaying an image within the recommended field of view at the current moment.

14. The client device according to claim 8, wherein the client device is further caused to:

display prompt information, wherein the prompt information is used to prompt a user to switch a field of view.

15. A non-transitory computer readable storage medium, Comprising instructions, wherein when the instructions executed by a computer, the computer is caused to perform the method according to claim 1.

* * * * *